United States Patent
Yang et al.

(10) Patent No.: US 11,425,537 B2
(45) Date of Patent: Aug. 23, 2022

(54) COMMUNICATIONS SYSTEM, COMMUNICATION METHOD, AND APPARATUS THEREOF

(71) Applicant: HUAWEI TECHNOLOGIES CO., LTD., Shenzhen (CN)

(72) Inventors: Yanmei Yang, Beijing (CN); Cuili Ge, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 174 days.

(21) Appl. No.: 16/858,544

(22) Filed: Apr. 24, 2020

(65) Prior Publication Data

US 2020/0260233 A1 Aug. 13, 2020

Related U.S. Application Data

(63) Continuation of application No. PCT/CN2018/108007, filed on Sep. 27, 2018.

(30) Foreign Application Priority Data

Oct. 24, 2017 (CN) .......................... 201710995859.4

(51) Int. Cl.
*H04H 20/71* (2008.01)
*H04W 4/06* (2009.01)
(Continued)

(52) U.S. Cl.
CPC .............. *H04W 4/06* (2013.01); *H04L 12/185* (2013.01); *H04L 12/189* (2013.01); *H04W 8/02* (2013.01);
(Continued)

(58) Field of Classification Search
CPC ....... H04W 4/06; H04W 8/02; H04W 72/005; H04W 76/11; H04W 76/12; H04W 88/14;
(Continued)

(56) References Cited

U.S. PATENT DOCUMENTS 8,325,675 B2 * 12/2012 Wu ...................... H04W 36/14
370/329
9,232,365 B1 1/2016 Mansour
(Continued)

FOREIGN PATENT DOCUMENTS

CN 101141688 A 3/2008
CN 101242353 A 8/2008
(Continued)

OTHER PUBLICATIONS

Huawei, HiSilicon, TS 23.501: Network Instance Usage Clarification. SA WG2 Meeting #123, Oct. 23-27, 2017, Ljubljana Slovenia, S2-177560, 3 pages.
(Continued)

*Primary Examiner* — Chuong T Ho
(74) *Attorney, Agent, or Firm* — Rimon PC

(57) ABSTRACT

This application discloses a communications system, a communication method, and an apparatus thereof. The system includes: a multicast session management network element, an access and mobility management network element and a user plane function network element. The multicast session management network element sends a first multicast session request carrying a multicast session context to the access and mobility management network element to request to establish a multicast session based on the multicast session context; and sends a second multicast session request to the user plane function network element, where the second multicast session request carries user plane forwarding-related information indicating a user plane forwarding rule of the multicast session. The access and mobility management network element sends the first multicast session request to an access network node. The user plane function network element sets, based on the user plane forwarding-
(Continued)

related information, the user plane forwarding rule of the multicast session.

17 Claims, 17 Drawing Sheets

(51) Int. Cl.
  *H04W 76/12* (2018.01)
  *H04W 76/11* (2018.01)
  *H04L 12/18* (2006.01)
  *H04W 8/02* (2009.01)
  *H04W 72/00* (2009.01)
(52) U.S. Cl.
  CPC .......... *H04W 72/005* (2013.01); *H04W 76/11* (2018.02); *H04W 76/12* (2018.02)
(58) Field of Classification Search
  CPC ..... H04W 92/24; H04W 76/40; H04W 24/02; H04L 12/185; H04L 12/189
  USPC .......................................................... 370/312
  See application file for complete search history.

(56) References Cited

U.S. PATENT DOCUMENTS

| | | | | |
|---|---|---|---|---|
| 9,787,483 B2* | 10/2017 | Liang | ................. | H04W 72/042 |
| 2012/0155282 A1* | 6/2012 | Dorenbosch | ........ | H04W 72/005 |
| | | | | 370/241.1 |
| 2018/0262424 A1* | 9/2018 | Roeland | .............. | H04L 41/0803 |
| 2019/0313286 A1* | 10/2019 | Stümpert | ............ | H04L 29/0653 |
| 2020/0329408 A1* | 10/2020 | Selvaganapathy | .......................... | |
| | | | | H04W 36/0069 |

FOREIGN PATENT DOCUMENTS

| | | |
|---|---|---|
| CN | 101296404 B | 2/2012 |
| CN | 105163285 A | 12/2015 |
| CN | 106792563 A | 5/2017 |
| CN | 107040898 A | 8/2017 |
| CN | 105009521 B | 10/2018 |
| CN | 109699013 B | 8/2020 |
| WO | 2015000141 A1 | 1/2015 |
| WO | 2015185111 A1 | 12/2015 |
| WO | 2017004771 A1 | 1/2017 |

OTHER PUBLICATIONS

Huawei, HiSilicon, OI#18 TS 23.501: Interaction between SMF and UPF on N4 Reference Point. SA WG2 Meeting #123, Oct. 23-27, 2017, Ljubljana, Slovenia, S2-177565, 8 pages.

3GPP TS 23.502 V1.2.0 (Sep. 2017), 3rd Generation Partnership Project;Technical Specification Group Services and System Aspects;Procedures for the 5G System;Stage 2(Release 15), 165 pages.

* cited by examiner

COMMUNICATIONS SYSTEM, COMMUNICATION METHOD, AND APPARATUS THEREOF

CROSS-REFERENCE TO RELATED APPLICATIONS

This application is a continuation of International Application No. PCT/CN2018/108007, filed on Sep. 27, 2018, which claims priority to Chinese Patent Application No. 201710995859.4, filed on Oct. 24, 2017, The disclosures of the aforementioned applications are hereby incorporated by reference in their entireties.

TECHNICAL FIELD

This application relates to the field of wireless communications technologies, and in particular, to a communications system, a communication method and an apparatus thereof.

BACKGROUND

With the development of 3GPP technologies, multicast service scenarios are emerging, such as a group hunting service, remote upgrade of Internet of Things device software, an Internet of Vehicles, and a broadcast and television service.

As shown in FIG. 1, FIG. 1 is a network architectural diagram of a multimedia broadcast/multicast service (MBMS) based on long term evolution (ILTE) in the prior art. A network element that is related to the MBMS and that is on a core network side includes: a broadcast-multicast service center (BM-SC) and a multimedia broadcast/multicast gateway (MBMS GW). The MBMS GW may be deployed independently or in combination with another network element (such as the BM-SC). The BM-SC is configured to: perform MBMS service control and transmission management, obtain third-party service data from a content provider and perform services such as control and transmission of the third-party service based on requirements of the third-party service data. The BM-SC triggers establishment of an MBMS session, and sends MBMS session control signaling and the third-party service data to the MBMS GW. The MBMS GW is configured to: receive the MBMS session control signaling from the BM-SC, and send the received data to a terminal (UE shown in FIG. 1) by using a radio access network (RAN).

In the MBMS network architecture, a service control function and a transmission management function are coupled to the BM-SC, and flexible deployment of devices cannot be implemented. Consequently, requirements of different business modes cannot be satisfied.

SUMMARY

Embodiments of this application provide a communications system, a communication method and an apparatus thereof, to achieve separation of a multicast service control function from a multicast transmission management function, thereby implementing flexible deployment of the service control function and the transmission management function.

According to a first aspect, a communications system is provided, including a multicast session management network element, an access and mobility management network element and a user plane function network element, where the multicast session management network element is configured to: send a first multicast session request to the access and mobility management network element, where the first multicast session request carries a multicast session context, and the first multicast session request is used to request to establish a multicast session based on the multicast session context; and send a second multicast session request to the user plane function network element, where the second multicast session request carries user plane forwarding-related information, and the user plane forwarding-related information is used to indicate a user plane forwarding rule of the multicast session;

the access and mobility management network element is configured to: receive the first multicast session request, and send the first multicast session request to an access network node; and the user plane function network element is configured to: receive the second multicast session request, and set, based on the user plane forwarding-related information, the user plane forwarding rule of the multicast session.

Optionally, the communications system further includes a multicast service control network element, where the multicast service control network element is configured to send a multicast service transmission request to the multicast session management network element, where the multicast service transmission request carries service description information of a multicast service;

the multicast session management network element is further configured to: receive the multicast service transmission request, and send the first multicast session request and the second multicast session request based on the multicast service transmission request; and the multicast session management network element is further configured to send a multicast service transmission response to the multicast service control network element, where the multicast service transmission response carries multicast transmission information of the multicast service.

As compared with an LTE system, in the foregoing embodiment, a multicast service control function and a multicast transmission control function are decoupled (for example, it may be understood that functions of a BM-SC and an MBMS-GW are reconstructed to a multicast service control network element and a multicast session network element), and a multicast control plane function and a user plane function are decoupled (for example, it may be understood that functions of the BM-SC and the MBMS-GW in another dimension are reconstructed to the multicast service control network element and the multicast session network element (a control plane) and the user plane function network element (a user plane)). Those functions are respectively defined in different core-network network elements, so that the implementation of a core-network network element that supports multicast transmission features can be simplified, and a network that supports multicast transmission can be customized and flexibly deployed as required. Moreover, complexity of a docking test between different network elements during deployment is reduced.

With reference to the existing 5G system, the existing multicast session management function (SMF) network element may be enhanced to implement a multicast session management function, so that a case in which two new entities, that is, the BM-SC and the MBMS-GW, are introduced to support multicast transmission in the 4G system may be avoided, and a simple function of the existing 5G network architecture can be upgraded to support multicast transmission features.

When a multicast service network element has a multicast service control function, to provide a multicast transmission service, an operator network only needs to provide the multicast session management network element. If the multicast service network element does not have the multicast service control function, the operator network further needs to provide the multicast service control network element. The operator network can provide the foregoing two networks to a third party by using a network slice.

Optionally, the multicast service control network element is further configured to: determine to transmit the multicast service by using a multicast transmission manner, and send the multicast service transmission request to the multicast session management network element after the determining to transmit the multicast service by using a multicast transmission manner.

In the foregoing embodiment, that the multicast service control network element determines the transmission manner helps a network side to perform quick and seamless switching between unicast and multicast based on information such as a service type and a network condition, thereby improving reliability of operator network data transmission.

Optionally, the multicast transmission information of the multicast service includes a user plane receiving address of the multicast session.

Optionally, the multicast transmission information may further include information such as a data using frequency of the multicast service, and a service area identifier list of the multicast service. Optionally, the multicast service transmission response further carries user plane function network element information (for example, an address or an identifier of the user plane function network element). Optionally, the multicast service transmission response may further carry an address of an access network node, for example, an access network node side user plane multicast receiving address.

Optionally, the service description information of the multicast service may include: media description information, a service type, QoS information and the like, and may further include: a quantity of terminals that receive the multicast service, and/or a location of a terminal that receives the multicast service.

Optionally, the multicast service control network element is further configured to send a service receiving indication message to a terminal, where the service receiving indication message is used to instruct the terminal to receive data of the multicast service. Optionally, the multicast transmission information of the multicast service includes at least one of a multicast transmission stream identifier and a user plane receiving address that are of the multicast service. Optionally, the service receiving indication message carries at least one of the multicast transmission stream identifier and the user plane receiving address.

In the foregoing embodiment, the terminal can listen to a broadcast channel corresponding to the multicast transmission stream identifier based on a receiving indication message, thereby obtaining data of the multicast service.

Optionally, the service receiving indication message sent by the multicast service control network element further carries information such as a frequency occupied by the data of the multicast service, and a service area identifier list of the multicast service.

Optionally, the multicast session management network element can further allocate the multicast transmission stream identifier to the multicast service. The second multicast session request sent by the multicast session management network element carries the multicast transmission stream identifier. The multicast transmission information in a multicast service transmission response includes the multicast transmission stream identifier.

Optionally, the second multicast session request further carries a user plane receiving address of the multicast session; and the multicast session management network element is further configured to allocate the user plane receiving address to the multicast session.

Optionally, the user plane function network element is further configured to: allocate a user plane receiving address to the multicast session, and send a second multicast session response to the multicast session management network element, where the second multicast session response carries the user plane receiving address.

Optionally, the first multicast session request carries an access network node side user plane multicast receiving address, and the second multicast session request carries the access network node side user plane multicast receiving address; and the multicast session management network element is further configured to allocate the access network node side user plane multicast receiving address to the multicast session.

In the foregoing embodiment, using the multicast transmission manner between the user plane function network element and the access network node can improve data transmission efficiency. That the multicast session management network element allocates the access network node side user plane multicast receiving address to the multicast session may reduce signaling interaction and waiting between the multicast session management network element and the user plane function network element.

Optionally, the user plane function network element is further configured to: allocate an access network node side user plane multicast receiving address to the multicast session, and send the access network node side user plane multicast receiving address to the multicast session management network element; and the multicast session management network element is further configured to: receive the access network node side user plane multicast receiving address, and add the access network node side user plane multicast receiving address to the first multicast session request.

In the foregoing embodiment, using the multicast transmission manner between the user plane function network element and the access network node can improve data transmission efficiency. That the user plane function network element allocates the access network node side user plane multicast receiving address to the multicast session can decouple the user plane function and the control plane function.

Optionally, the communications system further includes the access network node, where the access network node is configured to: receive the first multicast session request and join a multicast group based on the access network node side user plane multicast receiving address.

In the foregoing embodiment, using the multicast transmission manner between the user plane function network element and the access network node can improve data transmission efficiency.

Optionally, the communications system further includes the access network node, where the access network node is configured to: receive the first multicast session request from the access and mobility management network element, and send a first multicast session response to the access and mobility management network element, where the first multicast session response carries path information of the access network node, and the path information includes at least one of a downlink receiving address and a tunnel identifier;

the access and mobility management network element is further configured to: receive the first multicast session response, and send the first multicast session response to the multicast session management network element; and the multicast session management network element is further configured to: receive the first multicast session response, and add the path information of the access network node to the second multicast session request.

In the foregoing embodiment, using the multicast transmission manner between the user plane function network element and the access network node can improve data transmission efficiency. The transmission manner between the user plane function network element and the access network node is finally determined in a negotiated manner, so that diversity of manners of transmission between the access network node and the user plane function network element can be achieved, and a multicast network can be compatible with an access network node having a plurality of capabilities, thereby improving reliability of the multicast network.

Optionally, the communications system further includes the access network node, where the user plane function network element is further configured to forward, based on the user plane forwarding rule of the multicast session, data to the access network node by using the multicast session; and the access network node is further configured to: receive the data forwarded by the user plane function network element, and broadcast the data.

The foregoing embodiment can implement separation of user plane data from control plane signaling.

Optionally, the multicast session that has been established can further be updated, which may specifically include: the multicast session management network element is further configured to send a fourth multicast session request to the access and mobility management network element, where the fourth multicast session request carries a multicast session context, and the fourth multicast session request is used to request to update the multicast session based on the multicast session context carried in the fourth multicast session request; and the access and mobility management network element is configured to: receive the fourth multicast session request and send the fourth multicast session request to the access network node.

Optionally, the multicast session that has been established can further be updated, which may specifically include: the multicast session management network element is further configured to send a fifth multicast session request to the user plane function network element, where the fifth multicast session request carries user plane forwarding-related information, which is used to indicate a user plane forwarding rule of the multicast session, and the fifth multicast session request is used to request to update the user plane forwarding rule of the multicast session based on the user plane forwarding-related information carried in the fifth multicast session request; and the user plane function network element is configured to: receive the fifth multicast session request, and update the user plane forwarding rule of the multicast session based on the user plane forwarding-related information carried in the fifth multicast session request.

According to a second aspect, a communication method is provided, including:

sending, by a multicast session management network element, a first multicast session request to an access and mobility management network element, where the first multicast session request carries a multicast session context, and the first multicast session request is used to request to establish a multicast session based on the multicast session context; and sending, by the multicast session management network element, a second multicast session request to a user plane function network element, where the second multicast session request carries user plane forwarding-related information, and the user plane forwarding-related information is used to indicate a user plane forwarding rule of the multicast session.

Optionally, the method further includes:

receiving, by the multicast session management network element, a multicast service transmission request from a multicast service network element;

sending, by the multicast session management network element, a multicast service transmission response to the multicast service network element, where the multicast service transmission response carries multicast transmission information of the multicast service;

the sending, by a multicast session management network element, a first multicast session request to an access and mobility management network element includes:

sending, by the multicast session management network element, based on the multicast service transmission request, the first multicast session request to the access and mobility management network element; and the sending, by the multicast session management network element, a second multicast session request to a user plane function network element includes:

sending, by the multicast session management network element, based on the multicast service transmission request, the second multicast session request to the user plane function network element.

Optionally, the multicast service network element is an application server, a service capability exposure function SCEF network element or a multicast service control network element.

Optionally, multicast transmission information of the multicast service includes a user plane receiving address of the multicast session.

Optionally, the method further includes:

allocating, by the multicast session management network element, the user plane receiving address to the multicast session, where the second multicast session request further carries the user plane receiving address; or receiving, by the multicast session management network element, a second multicast session response from the user plane function network element, where the second multicast session response carries the user plane receiving address, and the user plane receiving address is allocated by the user plane function network element to the multicast session.

Optionally, the method further includes: allocating, by the multicast session management network element, an access network node side user plane multicast receiving address to the multicast session, where the first multicast session request and the second multicast session request carry the access network node side user plane multicast receiving address.

Optionally, the method further includes: receiving, by the multicast session management network element, an access network node side user plane multicast receiving address from the user plane function network element, and adding the access network node side user plane multicast receiving address to the first multicast session request.

Optionally, the method further includes: receiving, by the multicast session management network element, a first multicast session response from the access and mobility management network element, where the first multicast session response carries path information of the access network node; and adding the path information of the access network node to the second multicast session request, where the path information includes at least one of a downlink receiving address and a tunnel identifier.

According to a third aspect, a communication method is provided, including:

sending, by a multicast service control network element, a multicast service transmission request to a multicast session management network element, where the multicast service transmission request carries service description information of a multicast service; and receiving, by the multicast service control network element, a multicast service transmission response from the multicast session management network element, where the multicast service transmission response carries multicast transmission information of the multicast service.

In the foregoing embodiment, the multicast service control network element sends the service description information to the multicast session management network element, to trigger the multicast session management network element to establish or update a multicast session, that is, establish or update a multicast transmission path, receive the multicast transmission information, and obtain information about the multicast transmission path.

Optionally, the method further includes:

determining, by the multicast service control network element, to transmit the multicast service by using a multicast transmission manner; and the sending, by a multicast service control network element, a multicast service transmission request to a multicast session management network element includes:

sending the multicast service transmission request to the multicast session management network element after the determining to transmit the multicast service by using a multicast transmission manner.

In the foregoing embodiment, that the multicast service control network element determines the transmission manner helps a network side to perform quick and seamless switching between unicast and multicast based on information such as a service type and a network condition, thereby improving reliability of operator network data transmission.

Optionally, the multicast transmission information of the multicast service includes at least one of a user plane receiving address of the multicast session and a multicast transmission stream identifier of the multicast service.

Optionally, the method further includes: sending, by the multicast service control network element, a service receiving indication message to a terminal. The service receiving indication message is used to instruct the terminal to receive data of the multicast service. Optionally, the service receiving indication message carries at least one of the multicast transmission stream identifier and the user plane receiving address.

In the foregoing embodiment, the terminal can listen to a broadcast channel corresponding to the multicast transmission stream identifier based on a receiving indication message, thereby obtaining data.

According to a fourth aspect, a communication method is provided, including:

receiving, by a user plane function network element, a multicast session request from a multicast session management network element, where the multicast session request carries user plane forwarding-related information; and setting, by the user plane function network element, a user plane forwarding rule of a multicast session based on the user plane forwarding-related information.

In the foregoing embodiment, based on the obtained user plane forwarding rule, the user plane function network element can apply and process data content based on the rule, and distribute the data content to a specific area.

Optionally, the method further includes:

allocating, by the user plane function network element, a user plane receiving address to the multicast session; and sending, by the user plane function network element, a multicast session response to the multicast session management network element, where the multicast session response carries the user plane receiving address.

Optionally, the method further includes:

allocating, by the user plane function network element, an access network node side user plane multicast receiving address to the multicast session; and sending, by the user plane function network element, the access network node side user plane multicast receiving address to the multicast session management network element.

In the foregoing embodiment, that the transmission between the user plane function network element and the access network node is the multicast transmission manner can be implemented, thereby improving transmission efficiency.

Optionally, the multicast session request carries path information of the access network node, and the path information includes at least one of a downlink receiving address and a tunnel identifier.

In the foregoing embodiment, that an access network node having a plurality of capabilities is compatible can be implemented, and transmission diversity of the user plane function network element and the access network node can be implemented.

Optionally, the multicast session request carries the access network node side user plane multicast receiving address and the path information of the access network node, where the path information includes at least one of the downlink receiving address and the tunnel identifier.

Optionally, the user plane function network element is further configured to forward, based on the user plane forwarding rule of the multicast session, data to the access network node by using the multicast session.

According to a fifth aspect, a multicast session management network element is provided, including:

a first multicast session request module, configured to send a first multicast session request to an access and mobility management network element, where the first multicast session request carries a multicast session context, and the first multicast session request is used to request to establish a multicast session based on the multicast session context; and a second multicast session request module, configured to send a second multicast session request to a user plane function network element, where the second multicast session request carries user plane forwarding-related information, and the user plane forwarding-related information is used to indicate a user plane forwarding rule of the multicast session.

Optionally, the multicast session management network element further includes a multicast service transmission request processing module:

the multicast service transmission request processing module is configured to: receive a multicast service transmission request from a multicast service network element, and send a multicast service transmission response to the multicast service network element, where the multicast service transmission response carries multicast transmission information of the multicast service; and the first multicast session request module is specifically configured to send the first multicast session request based on the multicast service transmission request, and the second multicast session request module is specifically configured to send the second multicast session request based on the multicast service transmission request.

Optionally, the multicast service network element is an application server, a service capability exposure network element or a multicast service control network element.

Optionally, multicast transmission information of the multicast service includes a user plane receiving address of the multicast session.

Optionally, the second multicast session request module is further configured to allocate the user plane receiving address to the multicast session, where the second multicast session request further carries the user plane receiving address; or the second multicast session request module is further configured to receive a second multicast session response from the user plane function network element, where the second multicast session response carries the user plane receiving address, and the user plane receiving address is allocated by the user plane function network element to the multicast session.

Optionally, the first multicast session request module is further configured to allocate an access network node side user plane multicast receiving address to the multicast session; and the first multicast session request carries the access network node side user plane multicast receiving address, and the second multicast session request carries the access network node side user plane multicast receiving address.

Optionally, the first multicast session request module is further configured to: receive an access network node side user plane multicast receiving address from the user plane function network element, and add the access network node side user plane multicast receiving address to the first multicast session request.

Optionally, the first multicast session request module is further configured to receive a first multicast session response from the access and mobility management network element, where the first multicast session response carries path information of the access network node, and the path information includes at least one of a downlink receiving address and a tunnel identifier; and the second multicast session request module is further configured to add the path information of the access network node to the second multicast session request.

According to a sixth aspect, a multicast service control network element is provided, including:

a multicast service transmission request sending module, configured to send a multicast service transmission request to a multicast session management network element, where the multicast service transmission request carries service description information of a multicast service; and a multicast service transmission response receiving module, configured to receive a multicast service transmission response from the multicast session management network element, where the multicast service transmission response carries multicast transmission information of the multicast service.

Optionally, the multicast service control network element further includes a service transmission manner determining module, configured to determine to transmit the multicast service by using a multicast transmission manner; and the multicast service transmission request sending module is specifically configured to send the multicast service transmission request to the multicast session management network element after the determining to transmit the multicast service by using the multicast transmission manner.

Optionally, the multicast transmission information of the multicast service includes at least one of a user plane receiving address of the multicast session and a multicast transmission stream identifier of the multicast service.

Optionally, the multicast service control network element further includes a multicast service receiving indication module, configured to send a service receiving indication message to a terminal, where the service receiving indication message is used to instruct the terminal to receive data of the multicast service. Optionally, the service receiving indication message includes at least one of the multicast transmission stream identifier and the user plane receiving address.

According to a seventh aspect, a user plane function network element is provided, including:

a multicast session request receiving module, configured to receive a multicast session request from a multicast session management network element, where the multicast session request carries user plane forwarding-related information; and a multicast session request processing module, configured to set a user plane forwarding rule of a multicast session based on the user plane forwarding-related information.

Optionally, the multicast session request processing module is further configured to: allocate a user plane receiving address to the multicast session, and send a multicast session response to the multicast session management network element, where the multicast session response carries the user plane receiving address.

Optionally, the multicast session request processing module is further configured to: allocate an access network node side user plane multicast receiving address to the multicast session, and send the access network node side user plane multicast receiving address to the multicast session management network element. The multicast session request may carry path information of the access network node, and the path information includes at least one of a downlink receiving address and a tunnel identifier.

Optionally, the multicast session request carries the access network node side user plane multicast receiving address and the path information of the access network node, where the path information includes at least one of the downlink receiving address and the tunnel identifier.

Optionally, the user plane function network element further includes a data forwarding module, configured to forward, based on the user plane forwarding rule of the multicast session, data to the access network node by using the multicast session.

According to an eighth aspect, an embodiment of this application further provides a multicast session management network element. The network element has a function of implementing the behavior of the multicast session management network element in the method example in the second aspect. The function may be implemented by hardware or may be implemented by executing corresponding software by hardware. The hardware or the software includes one or more modules corresponding to the foregoing function.

Optionally, a structure of the multicast session management network element includes a processor, a memory and a network interface, where the processor can perform corresponding functions in the method example of the second aspect. For specific details, refer to the detailed description in the method example in the second aspect. Details are not described herein again.

According to a ninth aspect, an embodiment of this application further provides a multicast service control network element. The network element has a function of implementing the behavior of the multicast service control network element in the method example in the third aspect. The function may be implemented by hardware or may be implemented by executing corresponding software by hardware. The hardware or the software includes one or more modules corresponding to the foregoing function.

Optionally, a structure of the multicast service control network element includes a processor, a memory and a network interface, where the processor can perform corresponding functions in the method example of the third aspect. For specific details, refer to the detailed description in the method example in the third aspect. Details are not described herein again.

According to a tenth aspect, an embodiment of this application further provides a user plane function network element. The network element has a function of implementing the behavior of the user plane function network element in the method example in the fourth aspect. The function may be implemented by hardware or may be implemented by executing corresponding software by hardware. The hardware or the software includes one or more modules corresponding to the foregoing function.

Optionally, a structure of the user plane function network element includes a processor, a memory and a network interface, where the processor can perform corresponding functions in the method example of the fourth aspect. For specific details, refer to the detailed description in the method example in the fourth aspect. Details are not described herein again.

According to an eleventh aspect, an embodiment of this application further provides a computer-readable storage medium. The computer-readable storage medium stores a computer-executable instruction, and the computer-executable instruction is used to enable the computer to perform the corresponding method in the example in the second aspect.

According to a twelfth aspect, an embodiment of this application further provides a computer-readable storage medium. The computer-readable storage medium stores a computer-executable instruction, and the computer-executable instruction is used to enable the computer to perform the corresponding method in the example in the third aspect.

According to a thirteenth aspect, an embodiment of this application further provides a computer-readable storage medium. The computer-readable storage medium stores a computer-executable instruction, and the computer-executable instruction is used to enable the computer to perform the corresponding method in the example in the fourth aspect.

According to a fourteenth aspect, an embodiment of this application provides a chip, where the chip includes a processor, configured to support a network element (a network device) in implementing the function related to the multicast session management network element in the second aspect. Optionally, the chip further includes a memory, and the memory is configured to store a program instruction and data that are necessary to the network element.

According to a fifteenth aspect, an embodiment of this application provides a chip, where the chip includes a processor, configured to support a network element (a network device) in implementing the function related to the multicast service control network element in the third aspect. Optionally, the chip further includes a memory, and the memory is configured to store a program instruction and data that are necessary to the network element.

According to a sixteenth aspect, an embodiment of this application provides a chip, where the chip includes a processor, configured to support a network element (a network device) in implementing the function related to the user plane function network element in the fourth aspect. Optionally, the chip further includes a memory, and the memory is configured to store a program instruction and data that are necessary to the network element.

The communications system provided in the embodiments of this application includes a multicast session management network element, an access and mobility management network element and a user plane function network element. A multicast service control network element can implement a multicast service control function, for example, receive service description information of a multicast service from an application server or a capability exposure network element, and send a multicast service transmission request to the multicast session management network element. The multicast session management network element can implement a multicast transmission management function, for example, send a first multicast session request to an access and mobility management network element, where the first multicast session request carries a multicast session context to request to establish a multicast session based on the multicast session context; and send a second multicast session request to the user plane function network element, where the second multicast session request carries user plane forwarding-related information to indicate a user plane forwarding rule of the multicast session. Because in the communications system provided in the embodiments of this application, the multicast service control function and the multicast transmission management function are implemented by using different network elements, the service control function and the transmission function can be decoupled, so that flexible deployment can be performed based on different requirements.

BRIEF DESCRIPTION OF DRAWINGS

Each of FIG. 2, FIG. 3

Figure 11:
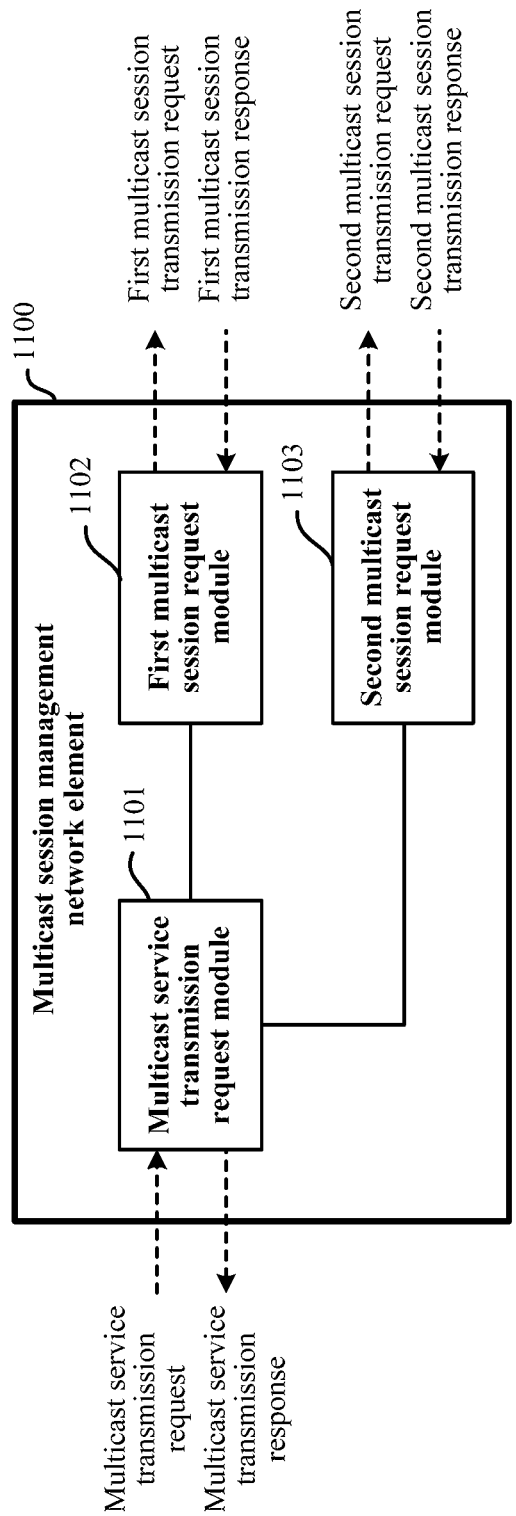
Figure 12:
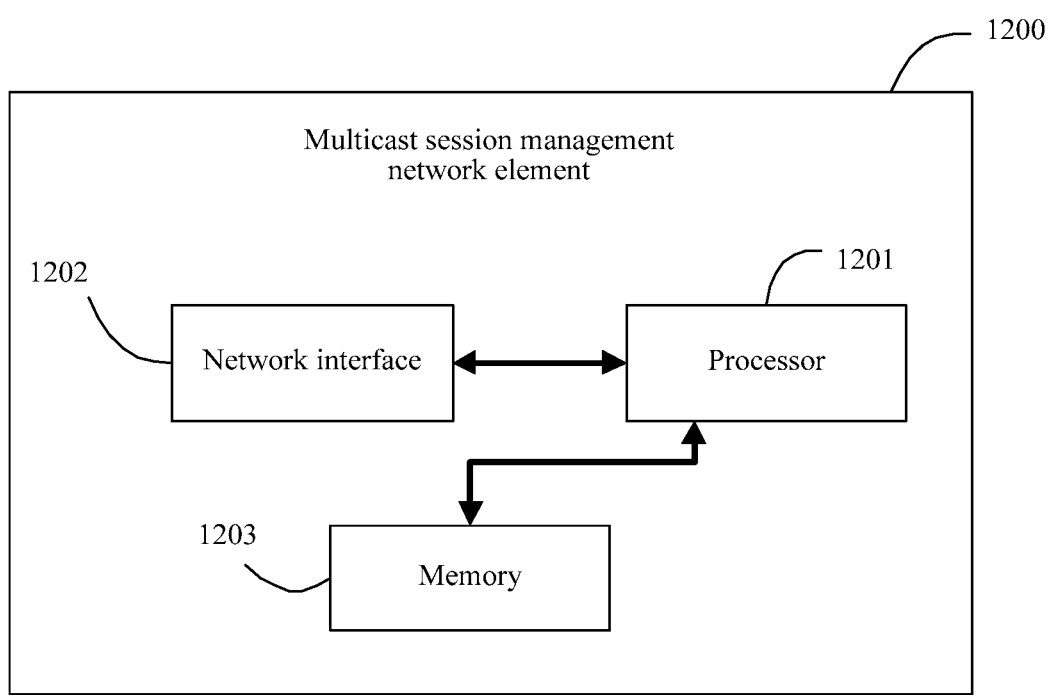
Figure 13:
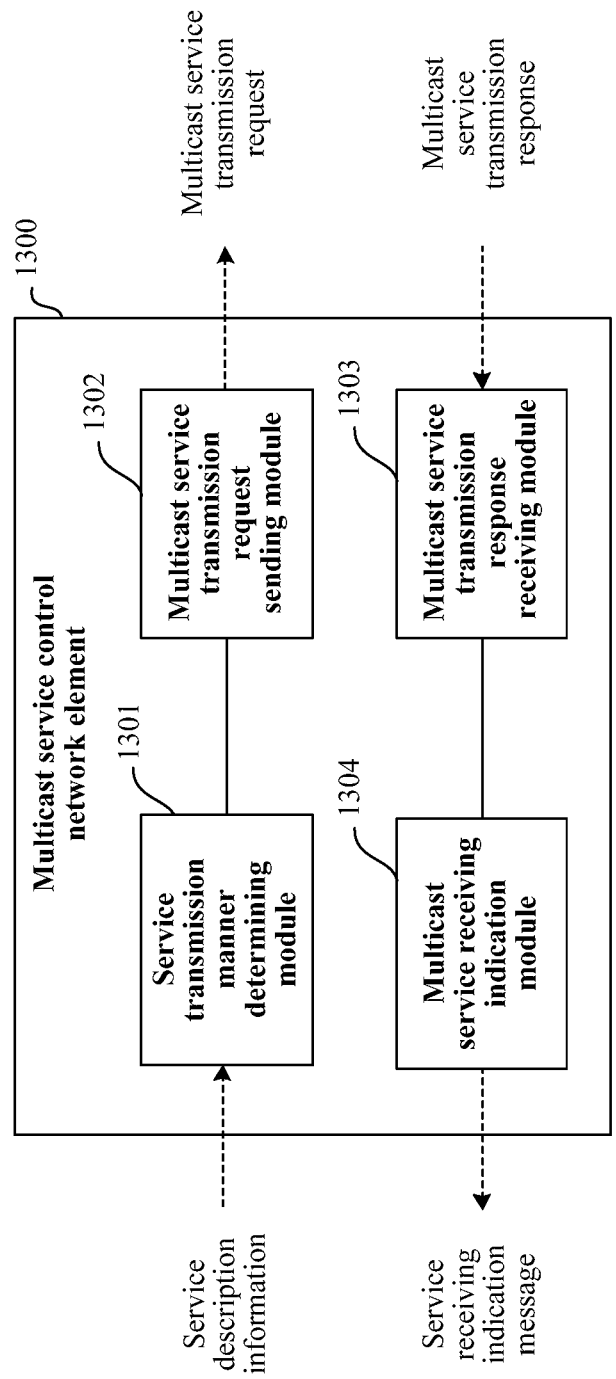
Figure 14:
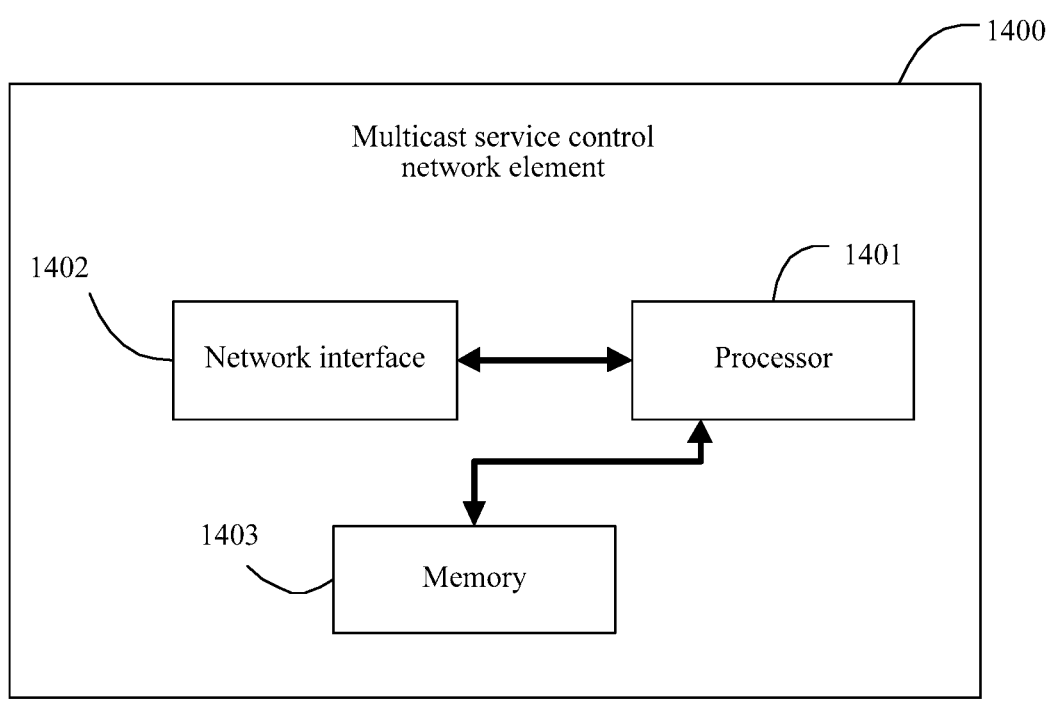
Figure 15:
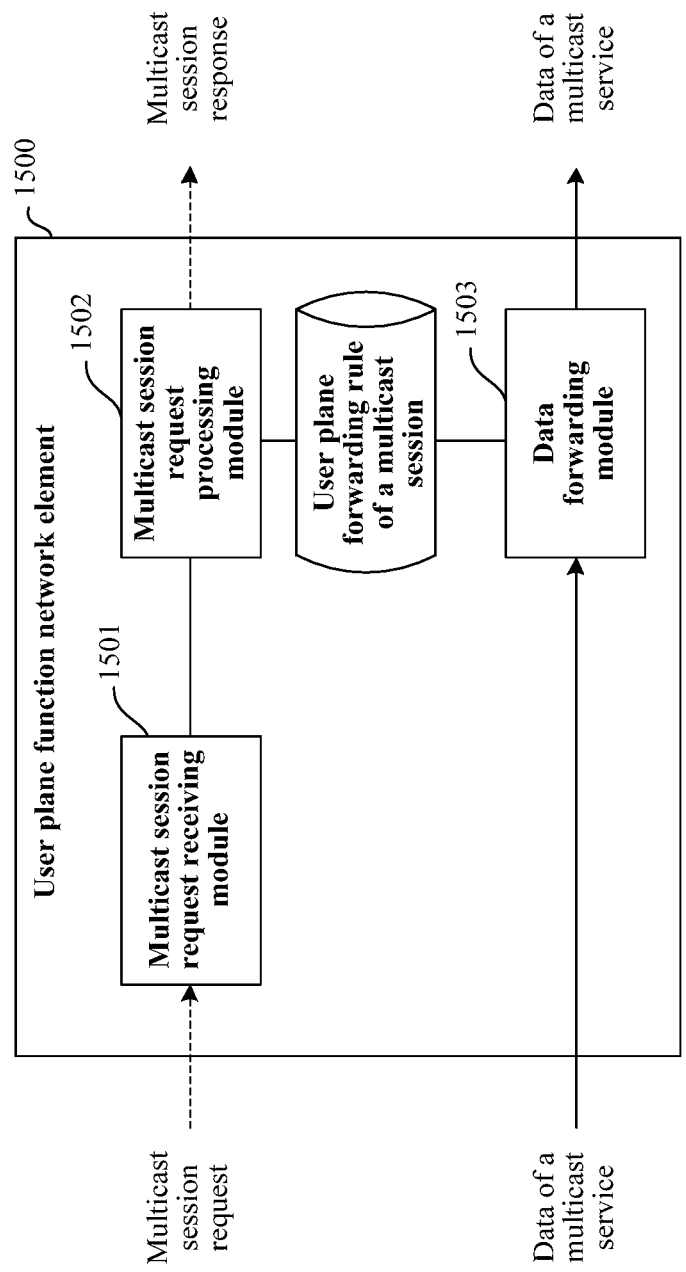
Figure 16:
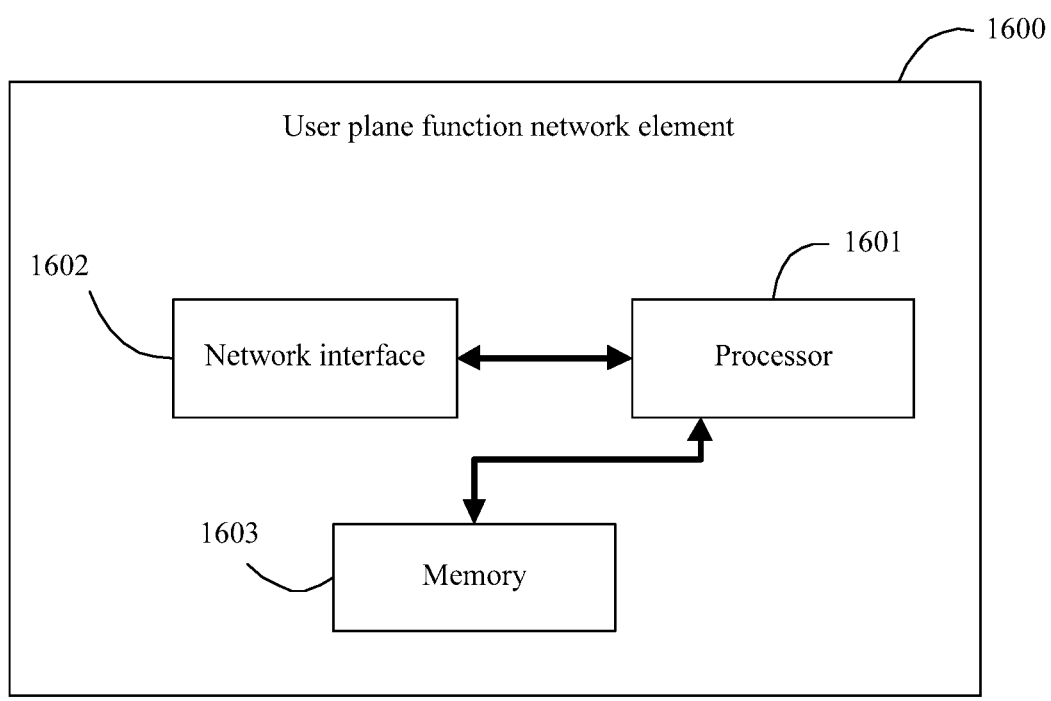

Each of FIG. 5A, FIG. 5B and FIG. 6 to FIG. 10 is a schematic diagram of a communication procedure according to an embodiment of this application;

Each of FIG. 11 and FIG. 12 is a schematic structural diagram of a multicast session management network element according to an embodiment of this application;

Each of FIG. 13 and FIG. 14 is a schematic structural diagram of a multicast service control network element according to an embodiment of this application; and Each of FIG. 15 and FIG. 16 is a schematic structural diagram of a user plane function network element according to an embodiment of this application.

DESCRIPTION OF EMBODIMENTS

The following describes the embodiment of this application with reference to accompanying drawings.

First, some terms in this application are explained for convenient understanding by persons skilled in the art.

(1) A RAN device, which may also be referred as a RAN node, is configured to connect a terminal to a wireless network, and includes but is not limited to: a next generation node B (NG Node B, gNB), an evolved node B (eNB), a radio network controller (RNC), a node B (NB), a base station controller (BSC), a base transceiver station (BTS), a home eNodeB (for example, a home evolved NodeB or a home Node B, HNB), a baseband unit (BBU), a wireless fidelity (WIFI) access point (AP), a transmission point (transmission and receiver point, TRP or transmission point, TP), a base station based on a new access technology and the like.

(2) A terminal is a device that provides voice and/or data connectivity for a user, and includes a wired terminal or a wireless terminal. The wireless terminal may be a handheld device having a wireless connection function, another processing device connected to a wireless network, or a mobile terminal that communicates with one or more core networks by using a radio access network. For example, the wireless terminal may be a mobile phone, a computer, a tablet computer, a personal digital assistant (PDA), a mobile Internet device (MID), a wearable device, an e-book reader, and the like. For another example, the wireless terminal may be a portable, pocket-sized, handheld, computer-built-in, or in-vehicle mobile device. For still another example, the wireless terminal may be a mobile station, or an access point.

(3) Interaction. The interaction in this application refers to a process of transferring information between the interaction parties. The transferred information may be the same or may be different. For example, the interaction parties are a base station 1 and a base station 2. It may be that the base station 1 requests information from the base station 2, and the base station 2 provides the information requested by the base station 1 for the base station 1. Certainly, it may also be that the base station 1 and the base station 2 request information from each other. The information may be the same or may be different.

(4) "A plurality of" means two or more than two. The term "and/or" describes an association relationship between associated objects and represents that three relationships may exist. For example, A and/or B may represent the following three cases: Only A exists, both A and B exist, and only B exists. The character "/" usually indicates an "or" relationship between the associated objects.

(5) "Multicast" refers to a point-to-multipoint transmission technology, which may be a one-to-many transmission relationship between an upstream node and a downstream node in the data transmission direction. For example, a one-to-many transmission channel is used to transmit data (data or signaling) in an air interface (namely, between an access network node and a terminal). "Multicast" may also be referred to as "broadcast", "groupcast", or "broadcast/multicast". This is not limited in this application.

It should be noted that a "multicast service" in the embodiments of this application may be a service of an operator, or may be a non-operator third party service. The "multicast service" is only a name, which indicates that a multicast transmission manner can be used for the service data, and does not indicate a service type. For example, the multicast service may be a V2X (vehicle-to-everything) service, a common voice service such as a VoLTE, a common video service, a public trunking service such as mission critical push-to-talk (MCPTT), a mission critical video (MCVideo), and mission critical data (MCData), a broadcast digital television service, an Internet of Things (IoT) service, or a cellular-based narrowband Internet of Things (nNB-IoT) service, and may be control signaling of some application layers. V in the "V2X" represents a vehicle, and X represents a plurality of entities. For example, V2V may represent vehicle to vehicle communication, V2P represents vehicle to pedestrian communication, V2I represents vehicle to infrastructure communication, and V2N represents vehicle to network communication.

In the embodiments of this application, "multicast service transmission request" is only an example of a message naming manner. "Multicast service transmission request" may also be replaced with another message name such as "multicast transmission stream request", "multicast bearer activation request", "multicast transmission path activation request", "multicast path update request" or "multicast path modification request". The message naming manner is not specifically limited in the embodiments of this application.

In the embodiments of this application, expressions such as "first multicast session request", "second multicast session request", "third multicast session request" and "fourth multicast session request" are used to distinguish different messages. In addition, in the embodiments of this application, "multicast session request" is only an example of a message naming manner. "Multicast session request" may also be replaced with another message name such as "multicast service session start request", "multicast session establishment request", "multicast session modification request", "multicast session establishment/modification request", "multicast service bearer modification request" or "multicast transmission path activation request" or "multicast transmission path establishment request", or "multicast transmission path update request". The message naming manner is not specifically limited in the embodiments of this application.

It should be noted that communication mentioned in this application may be applicable to a long term evolution (LTE) system, or another wireless communications system using various radio access technologies, for example, a system using an access technology such as code division multiple access (CDMA), frequency division multiple access (FDMA), time division multiple access (TDMA), orthogonal frequency division multiple access (OFDMA), or single carrier-frequency division multiple access (SC-FDMA). Moreover, communication may also be applicable to a subsequent evolution system such as a $5^{th}$ generation wireless ($5^{th}$ generation, 5G, which is also referred to as new radio (NR)) system, or an evolution system thereof.

Figure 2:
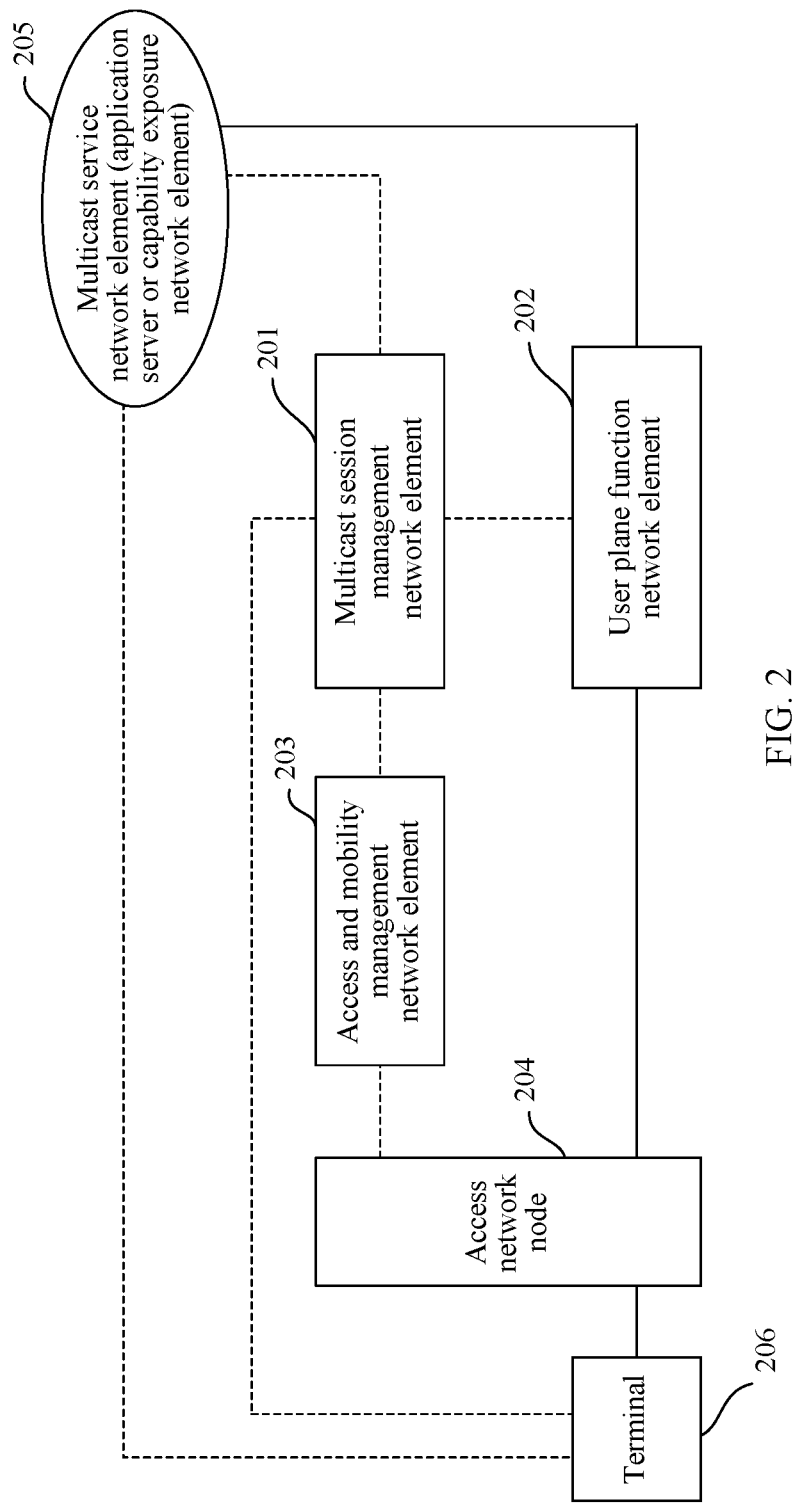

FIG. 2 shows a communications system according to an embodiment of this application. The communications system can implement separation of a service control function from a transmission management function that are of a multicast service.

The communications system shown in FIG. 2 includes: a multicast session management network element 201, a user plane function network element 202, and an access and mobility management network element 203.

Optionally, the communications system further includes an access network node 204.

In FIG. 2, the dashed line "---" may represent control plane connection between network elements, and the solid line "—" may represent user plane connection between network elements.

Optionally, when the communications system is applied to 5G, the user plane function network element 202 may be a user plane function (UPF) network element in the 5G system. The multicast session management network element 201 may be a multicast session management function (SMF) network element in the 5G system. For example, the transmission management function of the multicast service may be implemented by enhancing the SMF network element. The access and mobility management network element 203 may be an access and mobility management function (AMF) network element in the 5G system, and the access network node 204 may be a next generation radio access network (NG RAN) node in the 5G system.

Figure 1:
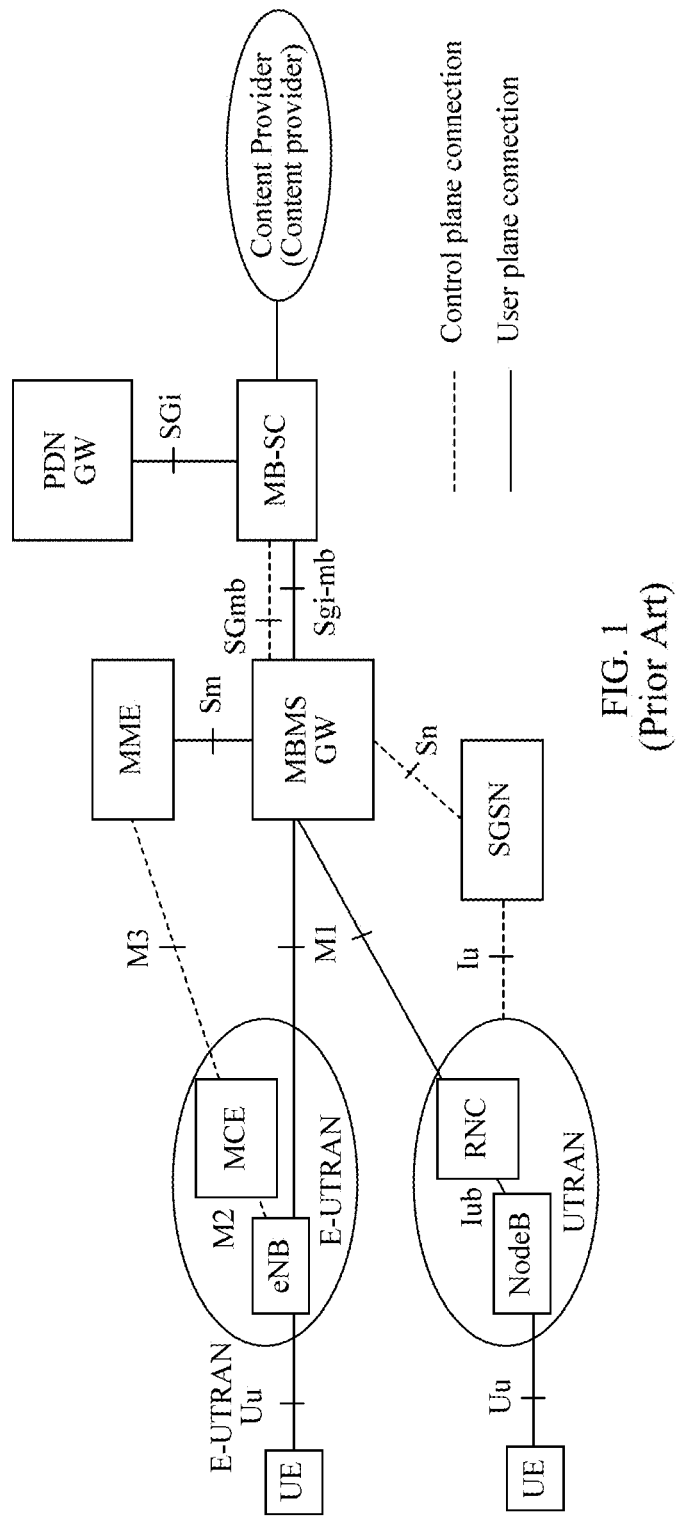
FIG. 1 is a schematic diagram of an MBMS network architecture based on LTE in the prior art.

Optionally, the multicast session management network element 201 may be implemented based on the existing MBMS network architecture. For example, the service control function and the transmission management function of the BM-SC in FIG. 1 are separated, and the separated transmission management function is implemented by the multicast session management network element 201.

In the communications system shown in FIG. 2, there may be a plurality of user plane function network elements 202. FIG. 2 only uses one user plane function network element 202 as an example. There may be a plurality of the access network nodes 204. FIG. 2 only uses one access network node as an example.

The multicast session management network element 201 is configured to send a first multicast session request to the access and mobility management network element 203, where the first multicast session request carries a multicast session context, and the first multicast session request is used to request to establish a multicast session based on the multicast session context.

The access and mobility management network element 203 is configured to: receive the first multicast session request, and send the first multicast session request to the access network node 204.

Optionally, the communications system may further include the access network node 204. The access network node 204 may be configured to: receive the first multicast session request and join a multicast group based on the access network node side user plane multicast receiving address.

The multicast session management network element 201 is further configured to send a second multicast session request to the user plane function network element 202, where the second multicast session request carries user plane forwarding-related information, and the user plane forwarding-related information is used to indicate a user plane forwarding rule of the multicast session.

The user plane function network element 202 is configured to: receive the second multicast session request and set, based on the user plane forwarding-related information, the user plane forwarding rule of the multicast session.

The multicast session refers to an association between a core-network network element and an access-network network element that participate in multicast service transmission and a multicast service area. For example, in the 4G communications system, the multicast session may be an MBMS session (MBMS session). Management of the multicast session is a maintenance process of a multicast transmission path of multicast service data, including establishment, update, and the like. In this embodiment of this application, the transmission path of the multicast service data may include the user plane function network element 202, and the access network node 204.

The user plane forwarding rule of the multicast session may be obtained based on the user plane forwarding-related information of the multicast session, so that the user plane function network element 202 can forward data of the multicast service to a corresponding terminal based on the user plane forwarding rule. Specifically, the user plane function network element 202 sends the data of the multicast service to the access network node 204; and the access network node 204 forwards the data of the multicast service to the corresponding terminal. For example, the user plane forwarding-related information may include a service data flow (SDF) template, and the SDF template is configured to mark a quintet (the quintet includes a source IP address, a source port, a destination IP address, a destination port and a transport layer protocol) to which a multicast transmission stream (which is also referred to as a multicast QoS stream in this embodiment of this application, where QoS is short for quality of service, that is, quality of service) is applied to. The user plane forwarding-related information may further include QoS information, for example, a session-aggregation maximum bit rate (Session-AMBR), and an allocation and retention priority (ARP).

The user plane forwarding rule may be generated by the multicast session management network element 201 and provided to the user plane function network element 202. For a specific process, refer to S603.

Optionally, the first multicast session request sent by the multicast session management network element 201 to the access and mobility management network element 203 may be carried by using an N11 reference point in the 5G system. The first multicast session request sent by the access and mobility management network element 203 to the access network node 204 may be carried by using an N2 reference point in the 5G system.

Optionally, the second multicast session request may be carried by using an N4 reference point in the 5G system.

Optionally, the multicast session management network element 201 can further allocate a multicast transmission stream identifier to the multicast service. The second multicast session request sent by the multicast session management network element 201 carries the multicast transmission stream identifier.

The multicast transmission stream may also be referred to as the multicast QoS stream. A multicast transmission stream identifier may be used to identify a multicast transmission stream. In the 4G communications system, the multicast transmission stream may correspond to an MBMS bearer, and the multicast transmission stream identifier may correspond to a temporary mobile group identity (TMGI), or correspond to a combination of a TMGI and a flow identifier (Flow ID). The multicast transmission stream represents that same data content is distributed in a specific multicast service area in a communication system. Data content mapped to a same multicast transmission stream is distributed to the same multicast service area. Different data content uses different multicast data flows.

Optionally, the multicast session management network element 201 may be further configured to allocate a user plane receiving address to the multicast session, where the second multicast session request can further carry a user plane receiving address of the multicast session. The user plane receiving address may be an IP address, the IP address is a multicast address, and the multicast address is specifically a groupcast address or a broadcast address. The IP address may be an IPv4 address, or an IPv6 address or a prefix of the IPv6 address.

Optionally, the user plane function network element 202 may be further configured to: allocate a user plane receiving address to the multicast session, and send a second multicast session response to the multicast session management network element 201, where the second multicast session response carries the user plane receiving address.

Optionally, the multicast session management network element 201 may be further configured to allocate the access network node side user plane multicast receiving address to the multicast session. The first multicast session request carries the access network node side user plane multicast receiving address. The user plane multicast receiving address of the access network node may be an IP address, the IP address is a multicast address, and the multicast address is specifically a groupcast address or a broadcast address. The IP address may be an IPv4 address, or an IPv6 address or a prefix of the IPv6 address.

In this embodiment, using the multicast transmission manner between the user plane function network element and the access network node can improve data transmission efficiency. That the multicast session management network element allocates the access network node side user plane multicast receiving address to the multicast session may reduce signaling interaction and waiting between the multicast session management network element and the user plane function network element.

Optionally, the user plane function network element 202 may be further configured to: allocate an access network node side user plane multicast receiving address to the multicast session, and send the access network node side user plane multicast receiving address to the multicast session management network element 201. The multicast session management network element 201 may be further configured to: receive the access network node side user plane multicast receiving address, and add the access network node side user plane multicast receiving address to the first multicast session request.

In this embodiment, using the multicast transmission manner between the user plane function network element and the access network node can improve data transmission efficiency. That the user plane function network element allocates the access network node side user plane multicast receiving address to the multicast session can decouple the user plane function and the control plane function.

Optionally, the access network node 204 is configured to: receive the first multicast session request from the access and mobility management network element 203, and send a first multicast session response to the access and mobility management network element 203, where the first multicast session response carries path information of the access network node 204, and the path information includes at least one of a downlink receiving address and a tunnel identifier. The access and mobility management network element 203 is further configured to: receive the first multicast session response, and send the first multicast session response to the multicast session management network element 201. The multicast session management network element 201 is further configured to: receive the first multicast session response, and add the path information of the access network node 204 to the second multicast session request.

In this embodiment, using the multicast transmission manner between the user plane function network element and the access network node can improve data transmission efficiency. The transmission manner between the user plane function network element and the access network node is finally determined in a negotiated manner, so that diversity of manners of transmission between the access network node and the user plane function network element can be achieved, and a multicast network can be compatible with an access network node having a plurality of capabilities, thereby improving reliability of the multicast network.

Optionally, the user plane function network element 202 is further configured to: forward, based on the user plane forwarding rule of the multicast session, data to the access network node 204 by using the multicast session. The access network node 204 is further configured to: receive the data forwarded by the user plane function network element 202, and broadcast the data. In this embodiment, separation of user plane data from control plane signaling can be implemented.

Optionally, the multicast session management network element 201 may be further configured to send a fourth multicast session request to the access and mobility management network element 203, where the fourth multicast session request carries a multicast session context, and the fourth multicast session request is used to request to update the multicast session based on the multicast session context carried in the fourth multicast session request; and the access and mobility management network element 203 is configured to: receive the fourth multicast session request and send the fourth multicast session request to the access network node 204.

Optionally, the multicast session management network element 201 may be further configured to send a fifth multicast session request to the user plane function network element 202, where the fifth multicast session request carries user plane forwarding-related information, which is used to indicate a user plane forwarding rule of the multicast session, and the fifth multicast session request is used to request to update the user plane forwarding rule of the multicast session based on the user plane forwarding-related information carried in the fifth multicast session request; and the user plane function network element 202 is configured to: receive the fifth multicast session request, and update the user plane forwarding rule of the multicast session based on the user plane forwarding-related information carried in the fifth multicast session request.

Optionally, the communications system shown in FIG. 2 may further include a multicast service network element 205. The multicast service network element 205 may be configured to provide data of a multicast service, where the data of the multicast service may include user data and may also include signaling. The multicast service network element 205 may be a service operator or a third party application server, and may also be a capability exposure network element, for example, a service capability exposure function (SCEF), or a network exposure function (NEF).

Optionally, the multicast session management network element 201 is further configured to: receive a multicast service transmission request sent by the multicast service network element 205, and send the first multicast session request and the second multicast session request based on the multicast service transmission request, where the multicast service transmission request carries service description information of the multicast service. The multicast session management network element 201 may be further configured to send a multicast service transmission response to the multicast service network element, where the multicast service transmission response carries multicast transmission information of the multicast service.

Optionally, in an implementation scenario, the first multicast session request further carries one or more pieces of the following information:

the multicast transmission stream identifier, which may come from the multicast service transmission request sent by a multicast service control network element or may be dynamically allocated by the multicast session management network element; in a possible design, if the multicast service transmission request received by the multicast session management network element does not carry the multicast transmission stream identifier, the multicast session management network element allocates the multicast transmission stream identifier to the multicast service, and adds the multicast transmission stream identifier to the first multicast session request;

a source IP address of the multicast service;

QoS information of the multicast service; and service area information of the multicast service, where the information is used to identify a service area of the multicast service, and may be described by using the following one or more combinations: latitude and longitude, a group of cell identifiers, and a group of multicast service area identifiers. For example, the service area information may include a cell identifier list, and/or, a service area identifier list.

The service area information may be obtained based on the service description information of the multicast service. For example, the service description information includes the service area information. The service description information may be obtained based on a location of a terminal of the multicast service, and may be obtained through reporting by using a terminal of the multicast service. In addition, the service description information may be prestored in the multicast session management network element, or may be obtained from the multicast service control network element or an application server. For example, the multicast service control network element sends the multicast service transmission request to the multicast session management network element, where the multicast service transmission request carries the service description information of the multicast service.

Optionally, in another implementation scenario, the multicast session context carries one or more pieces of the following information: the multicast transmission stream identifier, the source IP address of the multicast service, the QoS information of the multicast service and the service area information of the multicast service.

Optionally, the service description information of the multicast service may include: media description information, a service type, QoS information and the like, and may further include at least one of a quantity of terminals that receive the multicast service, and a location of a terminal that receives the multicast service.

The multicast transmission information may include: the multicast transmission stream identifier of the multicast service. Optionally, the multicast transmission information may include a user plane receiving address of the multicast service, and may further include a data using frequency of the multicast service, and a service area identifier list of the multicast service. Optionally, a multicast service transmission response may further carry information such as user plane function network element information (for example, an IP address or an identifier of the user plane function network element 202). Optionally, the multicast service transmission response may further carry the access network node side user plane multicast receiving address of the multicast session.

Optionally, the communications system shown in FIG. 2 may further include a multicast service network element terminal 206. There may be a plurality of terminals 206.

FIG. 2 only uses one terminal as an example. The terminal 206 is configured to receive the transmission information of the multicast service and the data of the multicast service.

Optionally, the multicast session management network element 201 may be further configured to receive multicast transmission stream (the multicast transmission stream may also be referred to as a multicast QoS stream) status information sent by the terminal 206, where the multicast transmission stream status information is used to reflect multicast service receiving quality, so that the multicast session management network element 201 determines, based on the multicast transmission stream status information sent by the terminal 206, whether to transmit the data of the multicast service to the terminal by using a unicast manner; or updates the multicast session based on the multicast transmission stream status information sent by the terminal 206.

In the communications system shown in FIG. 2, for a specific implementation of a function of each network element, refer to related descriptions of procedures shown in the following FIG. 5A, FIG. 5B and FIG. 6 to FIG. 10.

Figure 3:
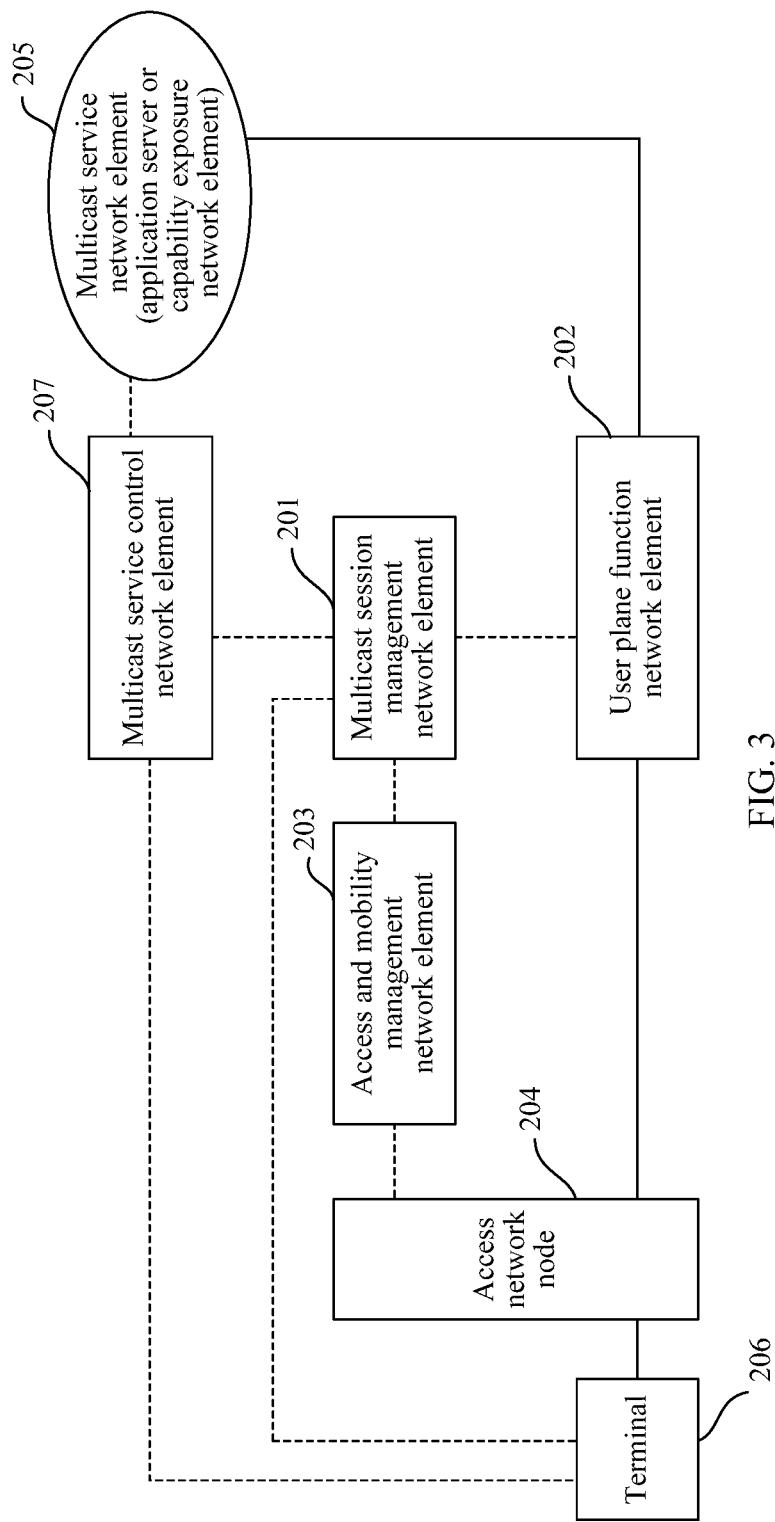

Optionally, referring to FIG. 3, the communications system may further include a multicast service control network element 207.

The multicast service control network element 207 may be configured to send a multicast service transmission request to the multicast session management network element 201, where the multicast service transmission request carries service description information of a multicast service. The multicast session management network element 201 is further configured to: receive the multicast service transmission request, and send the first multicast session request and the second multicast session request based on the multicast service transmission request. The multicast session management network element 201 is further configured to send a multicast service transmission response to the multicast service control network element 207, where the multicast service transmission response carries multicast transmission information of the multicast service. For descriptions of the service description information and the multicast transmission information, refer to the foregoing embodiments. Details are not described herein again.

Optionally, the multicast service control network element 207 is configured to: receive the service description information of the multicast service that is from the multicast service network element 205 (for example, the application server or the capability exposure network element); determine to transmit the multicast service by using a multicast transmission manner based on the service description information or based on other related information or by using another manner; and send the multicast service transmission request to the multicast session management network element 201.

In the foregoing embodiment, that the multicast service control network element determines the transmission manner helps a network side to perform quick and seamless switching between unicast and multicast based on information such as a service type and a network condition, thereby improving reliability of operator network data transmission.

The multicast transmission manner may include: a broadcast transmission manner, and a multicast/groupcast transmission manner. The multicast transmission manner refers to a data and/or signaling transmission manner between the access network node and user equipment, for example, may refer to signalcell point to multipoint (SCPTM), or may refer to an MBMS over Single frequency network (MBSFN).

Optionally, the multicast service control network element 207 may be further configured to: determine to transmit the multicast service by using a multicast transmission manner, and send the multicast service transmission request to the multicast session management network element 201 after the determining to transmit the multicast service by using the multicast transmission manner. In this embodiment, the terminal can listen to a broadcast channel corresponding to the multicast transmission stream identifier based on a receiving indication message, thereby obtaining data.

Optionally, the multicast transmission information of the multicast service includes the multicast transmission stream identifier of the multicast service. The multicast service control network element 207 is further configured to send a service receiving indication message to the terminal 206, where the service receiving indication message is used to instruct the terminal to receive data of the multicast service. Optionally, the service receiving indication message may carry at least one of the multicast transmission stream identifier and the user plane receiving address.

Optionally, the service receiving indication message sent by the multicast service control network element 207 further includes information such as a frequency occupied by the data of the multicast service, and the service area identifier list of the multicast service.

Optionally, the multicast session management network element 201 can further allocate the multicast transmission stream identifier to the multicast service. The second multicast session request sent by the multicast session management network element 201 carries the multicast transmission stream identifier. Optionally, the multicast transmission information in the multicast service transmission response includes the multicast transmission stream identifier.

Optionally, the user plane function network element may be configured to: receive the multicast service data from the multicast service network element and forward, based on the user plane forwarding rule of the multicast session, the multicast service data to the access network node by using the multicast session. The access network node is further configured to: receive the multicast service data forwarded by the user plane function network element, and broadcast the data.

Optionally, the multicast service control network element 207 may be configured to: receive the multicast service data from the multicast service network element 205, and send the multicast service data to the user plane function network element 202. The user plane function network element 202 is further configured to forward, based on the user plane forwarding rule of the multicast session, the multicast service data to the access network node 204 by using the multicast session. The access network node 204 is further configured to: receive the multicast service data forwarded by the user plane function network element 202, and broadcast the data.

In the communications system shown in FIG. 3, for a specific implementation of a function of each network element, refer to related descriptions of procedures shown in the following FIG. 5A, FIG. 5B and FIG. 6 to FIG. 10.

Figure 4:
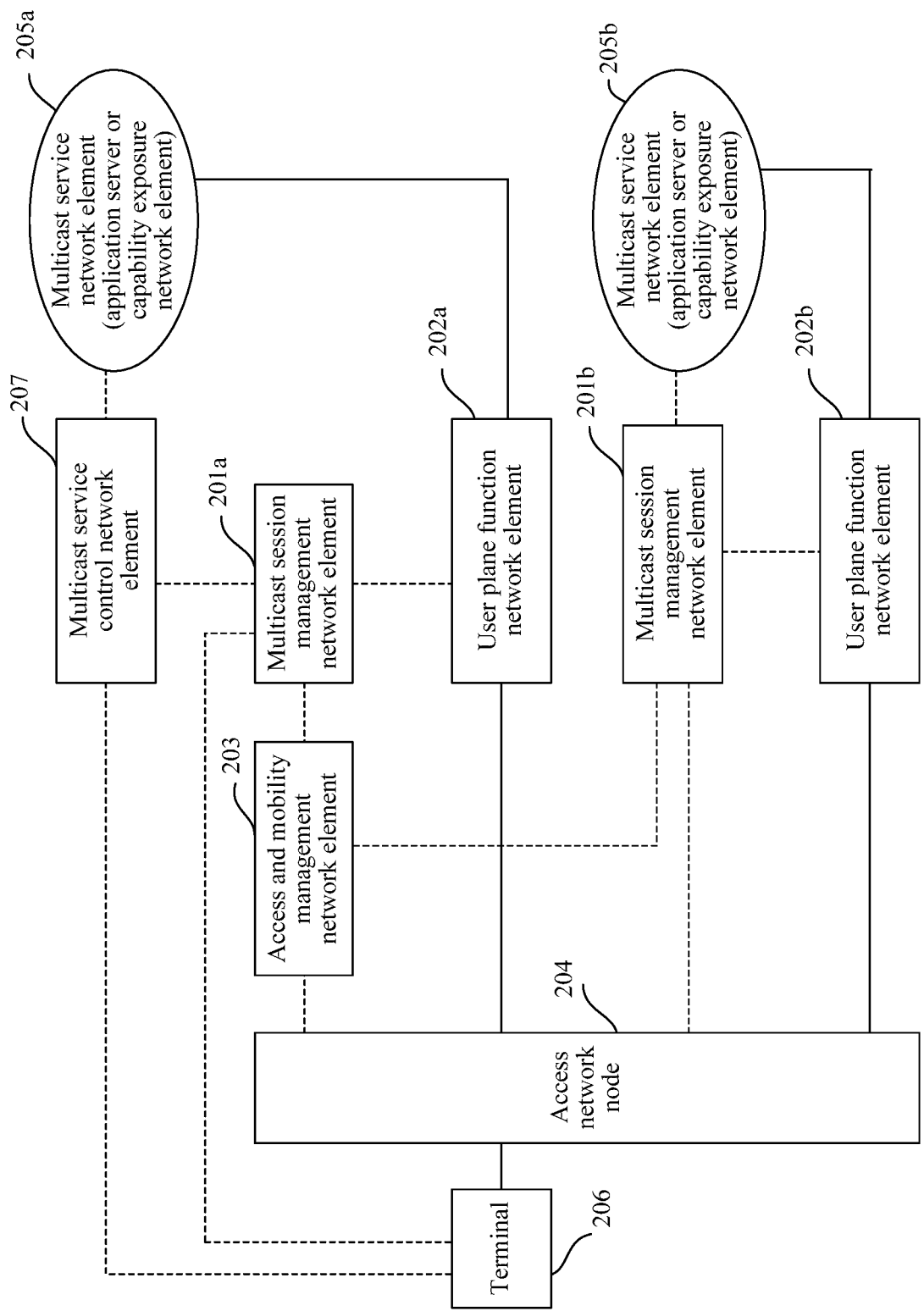
FIG. 4 is a schematic diagram of a communications system according to an embodiment of this application.

FIG. 4 is a schematic diagram of a communications system according to another embodiment of this application. As shown in FIG. 4, based on the communications system shown in FIG. 3, the multicast session management network element includes multicast session management network elements (201*a* and 202*b*), and the user plane function network element includes user plane function network elements (202*a* and 202*b*). Further, the communications system may further include the access network node 204. There may be more user plane function network elements, and there may be a plurality of the access network nodes 204, and a quantity of related network elements shown in FIG. 4 is only used as an example.

Optionally, the communications system shown in FIG. 4 further includes multicast service network elements (205*a* and 205*b*).

Optionally, the communications system shown in FIG. 4 further includes the multicast service network element terminal 206. There may be a plurality of terminals 206. FIG. 4 only uses one terminal as an example.

In the communications system shown in FIG. 4, functions of network elements such as the multicast service control network element 207, the multicast session management network element 201*a*, the user plane function network element 202*a* and the access and mobility management network element 203 are the same as the functions of the corresponding network elements in the communications system shown in FIG. 3. Functions of network elements such as the multicast session management network element 201*b*, the user plane function network element 202*b*, and the access and mobility management network element 203 may be the same as the functions of the corresponding network elements in the communications system shown in FIG. 2.

In the communications system shown in FIG. 4, for a specific implementation of a function of each network element, refer to related descriptions of procedures shown in the following FIG. 5A, FIG. 5B and FIG. 6 to FIG. 10.

Compared with an LTE system, the communications system provided in the foregoing embodiment decouples a multicast service control function and a multicast transmission control function (for example, it may be understood that functions of a BM-SC and an MBMS-GW are reconstructed to a multicast service control network element and a multicast session network element), and decouples a multicast control plane and a user plane (for example, it may be understood that functions of the BM-SC and the MBMS-GW in another dimension are reconstructed to the multicast service control network element and the multicast session network element (a control plane) and the user plane function network element (a user plane)). Those functions are respectively defined in different network elements, so that the implementation of a multicast transmission network element can be simplified, and a network that supports multicast transmission can be customized and flexibly deployed as required. Moreover, complexity of a docking test between different network elements during deployment is reduced.

With reference to the existing 5G system, the existing SMF network element may be enhanced to implement a multicast session management function, so that a case in which two new entities, that is, the BM-SC and the MBMS-GW, are introduced to support multicast transmission in the 4G system may be avoided, and a simple function of the existing 5G network architecture can be upgraded to support multicast transmission features.

If the multicast service network element implements a multicast service control function, to provide a service only used for transmission, an operator network only needs the multicast session management network element. If the multicast service network element does not provide the multicast service control function, the operator network only needs to provide the multicast service control function. The operator network can provide the foregoing two networks to a third party by using different network slices.

Procedures provided in the embodiments of this application are separately described in detail below with reference to FIG. 5A to FIG. 10. Procedures shown in FIG. 5A to FIG.

10 may be implemented based on the communications system shown in FIG. 3, FIG. 3A or FIG. 3B. For functions of related network elements in FIG. 5A to FIG. 10, refer to the communications system shown in FIG. 3, FIG. 3A or FIG. 3B. For related technical terminologies in FIG. 5A to FIG. 10, refer to related descriptions of the communications system shown in FIG. 3, FIG. 3A or FIG. 3B.

Figure 5A:
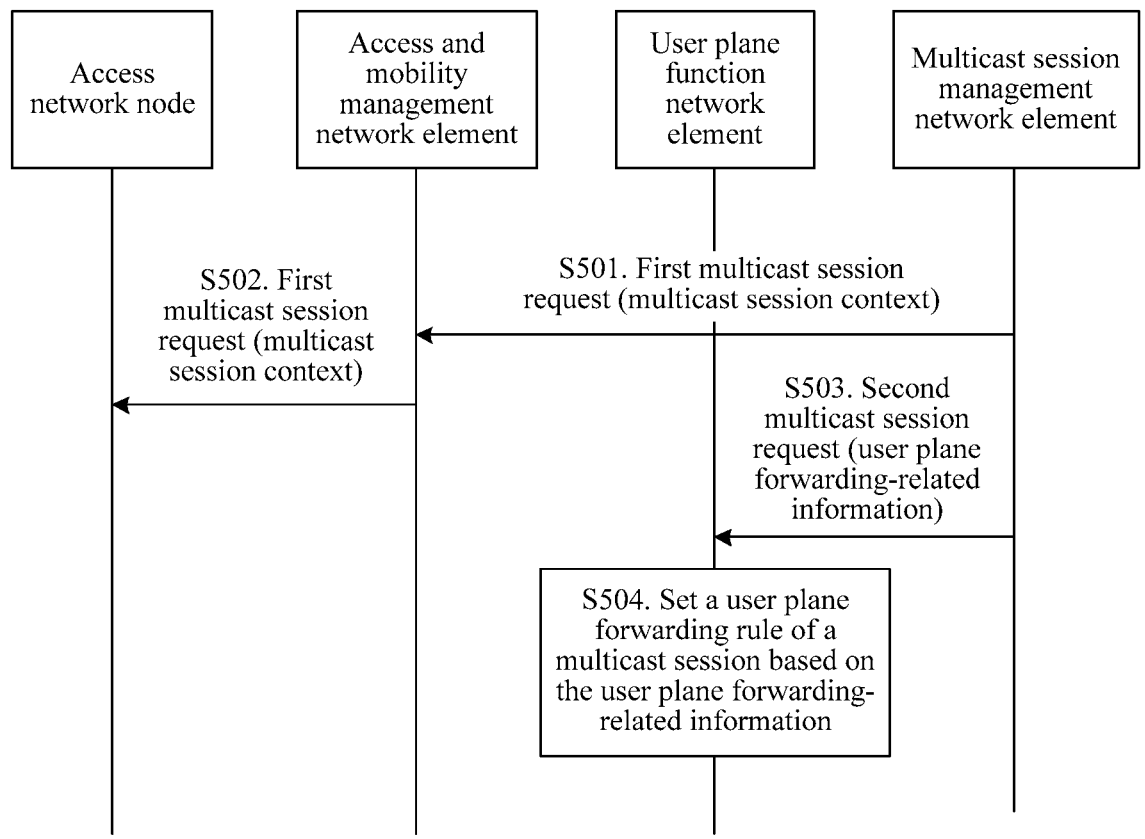

FIG. 5A shows a communications procedures according to an embodiment of this application. As shown in FIG. 5A, the procedure may include:

S501. The multicast session management network element sends the first multicast session request to the access and mobility management network element.

The first multicast session request carries the multicast session context, and the first multicast session request may be used to request to establish the multicast session based on the multicast session context.

S502. The access and mobility management network element receives the first multicast session request, and sends the first multicast session request to the access network node.

S503. The multicast session management network element sends the second multicast session request to the user plane function network element.

The second multicast session request carries the user plane forwarding-related information, where the user plane forwarding-related information may be used to indicate the user plane forwarding rule of the multicast session.

S504. The user plane function network element receives the second multicast session request, and sets, based on the user plane forwarding-related information, the user plane forwarding rule of the multicast session.

It should be noted that a message time sequence in the procedure shown in FIG. 5A is only an example. This application is not limited to the message time sequence shown in FIG. 5A. In another example, the multicast session management network element may first send the second multicast session request to the user plane function network element and then send the first multicast session request to the access and mobility management network element, and this may alternatively be performed simultaneously.

Optionally, the procedure (method) may further include: allocating, by the multicast session management network element, the access network node side user plane multicast receiving address to the multicast session. The first multicast session request and the second multicast session request may carry the access network node side user plane multicast receiving address.

Optionally, the procedure (method) may further include: receiving, by the access network node, the first multicast session request sent by the access and mobility management network element, and sending the first multicast session response to the access and mobility management network element, where the first multicast session response carries path information of the access network node, and the path information may include at least one of the downlink receiving address and the tunnel identifier. The access and mobility management network element further receives the first multicast session response, and sends the first multicast session response to the multicast session management network element. The multicast session management network element may further receive the first multicast session response, and add the path information of the access network node to the second multicast session request.

Optionally, the procedure (method) may further include: allocating, by the multicast session management network element, the multicast transmission stream identifier to the multicast service. The second multicast session request sent by the multicast session management network element may carry the multicast transmission stream identifier.

Optionally, the procedure (method) may further include: allocating, by the multicast session management network element, the user plane receiving address to the multicast session, where the second multicast session request may further carry the user plane receiving address of the multicast session.

Optionally, the procedure (method) may further include: allocating, by the user plane function network element, a user plane receiving address to the multicast session, and sending the second multicast session response to the multicast session management network element, where the second multicast session response may carry the user plane receiving address.

Optionally, the procedure (method) may further include: allocating, by the user plane function network element, the access network node side user plane multicast receiving address to the multicast session, and sending the access network node side user plane multicast receiving address to the multicast session management network element. The multicast session management network element may further receive the access network node side user plane multicast receiving address, and add the access network node side user plane multicast receiving address to the first multicast session request.

Optionally, the procedure (method) may further include: receiving, by the multicast session management network element, the multicast service transmission request from the multicast service network element, and sending the first multicast session request and the second multicast session request based on the multicast service transmission request, where the multicast service transmission request carries the service description information of the multicast service. The multicast session management network element may further send a multicast service transmission response to the multicast service network element, where the multicast service transmission response carries the multicast transmission information of the multicast service.

Optionally, the procedure (method) may further include: forwarding, by the user plane function network element, based on the user plane forwarding rule of the multicast session, the data to the access network node by using the multicast session. The access network node further receives the data forwarded by the user plane function network element, and broadcasts the data.

Optionally, the procedure (method) may further include: receiving, by the multicast session management network element, the multicast transmission stream (the multicast transmission stream may also be referred to as a multicast QoS stream) status information from the terminal, where the multicast transmission stream status information is used to reflect multicast service receiving quality, so that the multicast session management network element determines, based on the multicast transmission stream status information sent by the terminal, whether to transmit the data of the multicast service to the terminal by using the unicast manner; or updates the multicast session based on the multicast transmission stream status information sent by the terminal.

The embodiments described above may be combined with each other. For example, in a possible implementation, the access network node may send the first multicast session response to the access and mobility management network element, the access and mobility management network element sends the first multicast session response to the multicast session management network element, and the user plane function network element sends the second multicast session response to the multicast session management network element.

Figure 5B:
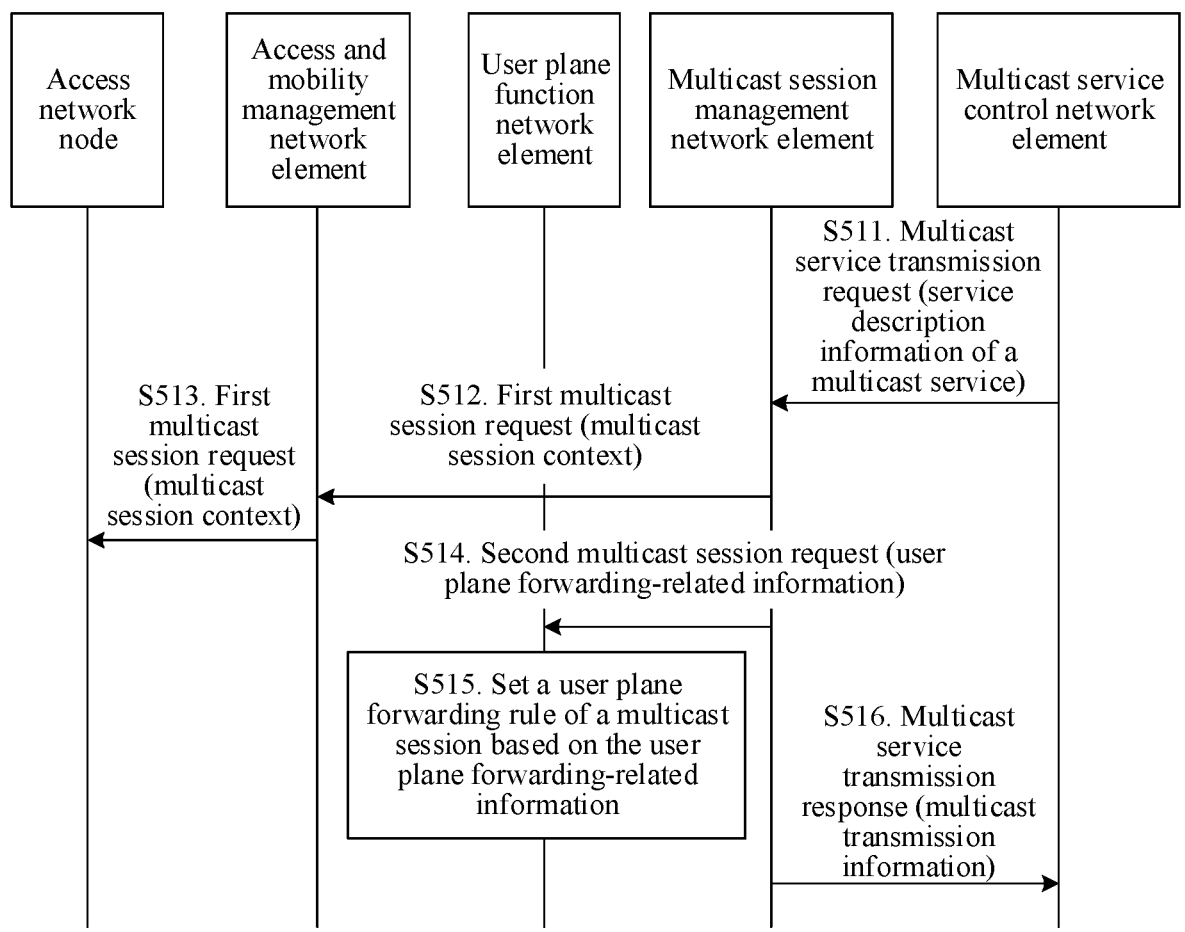

FIG. 5B shows a communication procedure according to another embodiment of this application. Interaction between the multicast session management network element and the multicast service control network element may be added to the procedure based on the procedure shown in FIG. 5A. As shown in FIG. 5B, the procedure may include:

S511. The multicast service control network element sends the multicast service transmission request to the multicast session management network element.

The multicast service transmission request carries the service description information of the multicast service.

S512. The multicast session management network element sends the first multicast session request to the access and mobility management network element, where the first multicast session request carries the multicast session context, and the first multicast session request is used to request to establish the multicast session based on the multicast session context.

S513. The access and mobility management network element receives the first multicast session request, and sends the first multicast session request to the access network node.

S514. The multicast session management network element sends the second multicast session request to the user plane function network element, where the second multicast session request carries the user plane forwarding-related information, and the user plane forwarding-related information is used to indicate the user plane forwarding rule of the multicast session.

S515. The user plane function network element receives the second multicast session request, and sets, based on the user plane forwarding-related information, the user plane forwarding rule of the multicast session.

S516. The multicast session management network element sends a multicast service transmission response to the multicast service control network element.

The multicast service transmission response carries the multicast transmission information of the multicast service.

For implementation processes from S512 to S516, refer to S501 to S504 in FIG. 5A.

Figure 6:
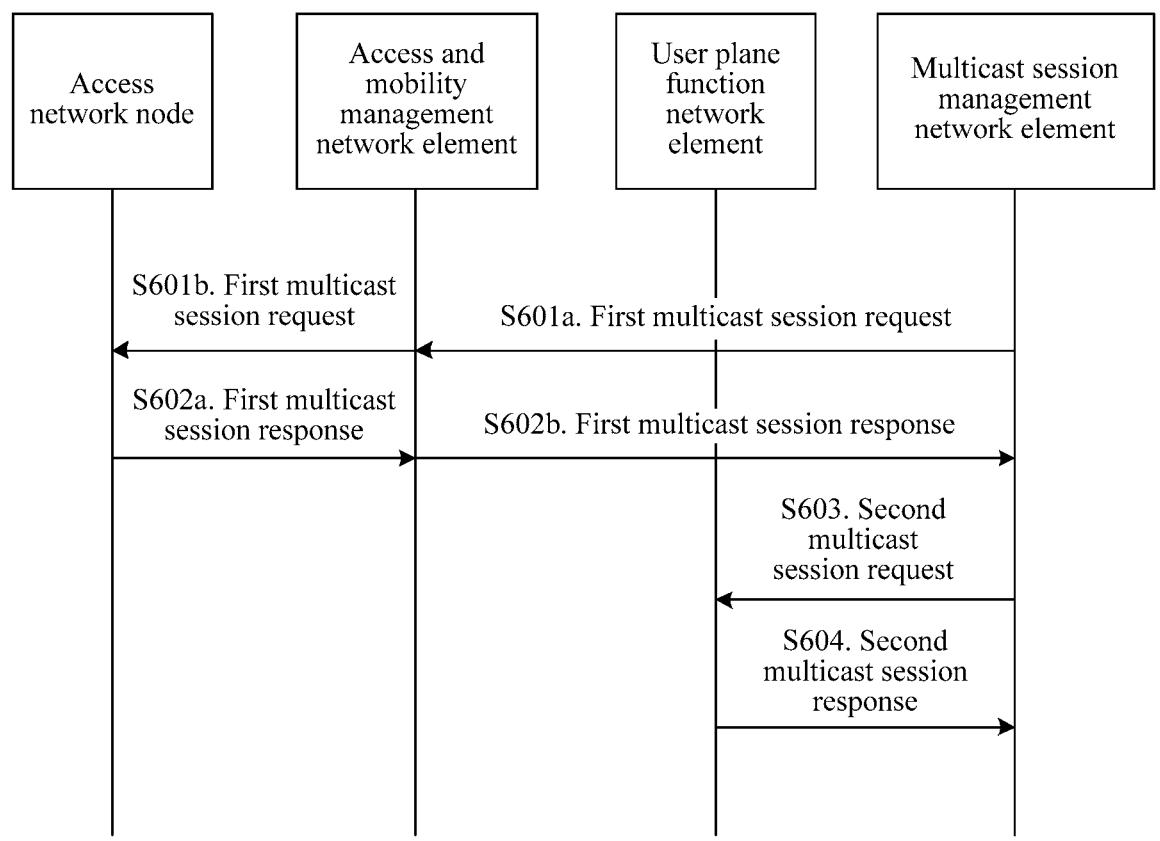

FIG. 6 is a schematic flowchart of a communication method according to an embodiment of this application. The procedure may be implemented based on any one of communications systems shown in FIG. 3 to FIG. 5.

S601a and S601b. The multicast session management network element sends the first multicast session request to the access and mobility management network element, and the access and mobility management network element sends the first multicast session request to the access network node.

The first multicast session request carries the multicast session context. The first multicast session request may be used to request to establish the multicast session based on the multicast session context.

For example, when establishing the multicast transmission path (the multicast session), the multicast session management network element allocates a multicast session identifier to the multicast session. The multicast session identifier may also be referred to as a multicast path identifier, and may be used to identify one multicast transmission path.

The multicast session context may include the multicast session identifier, and may further include QoS information of the multicast session.

Optionally, the first multicast session request carries the user plane receiving address of the multicast session. For example, the multicast session management network element allocates the user plane receiving address to the multicast session, and adds the user plane receiving address to the first multicast session request. The user plane receiving address may be the IP address, and the IP address may be the multicast address. Specifically, the multicast address may be the groupcast address or the broadcast address.

Optionally, the first multicast session request carries the access network node side user plane multicast receiving address of the multicast session. For example, the multicast session management network element may allocate the access network node side user plane multicast receiving address to the multicast session, and add the access network node side user plane multicast receiving address to the first multicast session request. The access network node side user plane multicast receiving address may be the IP address, and the IP address may be the multicast address. Specifically, the multicast address may be the groupcast address or the broadcast address.

Optionally, if the multicast session management network element has obtained the downlink receiving address and/or the tunnel identifier of the access network node, the first multicast session request may further carry the path information of the access network node, where the path information may include the downlink receiving address and/or the tunnel identifier.

Optionally, for other information carried in the first multicast session request, refer to descriptions in the foregoing embodiments. Details are not described herein again.

Optionally, the method further includes that the multicast session management network element can establish correspondences between two or more parameters in these parameters such as the multicast session identifier, the multicast transmission stream identifier of the multicast service, the multicast service area identifier, the user plane receiving address, and the access network node side user plane multicast receiving address. For example, the multicast session management network element establishes a correspondence between the multicast session identifier and one or more parameters in the following: the multicast transmission stream identifier of the multicast service, the multicast service area identifier, the user plane receiving address, and the access network node side user plane multicast receiving address. One multicast service can correspond to a unique multicast session. One multicast session may be identified by one multicast session identifier. One multicast session may include one or more multicast transmission streams. One multicast transmission stream is identified by one multicast transmission stream identifier.

Specifically, the access and mobility management network element in S601a and S601b may be determined by the multicast session management network element based on the service area information of the multicast service. For example, the multicast session management network element determines, based on the service area information of the multicast service, the access and mobility management network elements to which the first multicast session request is sent. Further, the access and mobility management network element can determine, based on the information carried in the received first multicast session request (for example, the service area information of the multicast service), the access network nodes to which the first multicast session request is sent. In addition, the access and mobility management network element in S601a and S601b may also be determined by the multicast session management network element based on a correspondence between the service area information and the access and mobility management network element. The correspondence may be stored on the multicast session management network element, or may be obtained from another device by the multicast session management network element. This is not limited herein.

Alternatively, when the access and mobility management network element interacts with the multicast session management network element by using a service-oriented application programming interface (API), step S601a may be replaced with that the multicast session management network element transfers the multicast session context to the access and mobility management network element by invoking the API. Further, the multicast session management network element may further transfer a related parameter carried in the first multicast session request and trigger a corresponding procedure.

Alternatively, when the access network node interacts with the access and mobility management network element by using the service-oriented API, step S601b may be replaced with that the access and mobility management network element transfers the multicast session context to the access network node by invoking the API. Further, the access and mobility management network element may further transfer a related parameter, where the related parameter may be the parameter carried in the first multicast session request, and trigger a corresponding procedure.

S602a and S602b. The access network node receives the first multicast session request, and sends the first multicast session response to the access and mobility management network element, where the access and mobility management network element sends the first multicast session response to the multicast session management network element.

Optionally, after receiving the first multicast session request, if the access network node accepts the request, the method further includes: configuring a radio broadcast resource based on the QoS information carried in the first multicast session request.

Optionally, when the access network node supports multicast, the method further includes: joining a multicast group based on the access network node side user plane multicast receiving address carried in the first multicast session request. Further, the access network node may be further configured to indicate that indication information used to indicate that the access network node joins the multicast group is carried in the first multicast session response.

Optionally, the method further includes: allocating, by the access network node, the tunnel identifier to the multicast session, where the tunnel identifier may be used to identify a tunnel, and the tunnel may be used by the access network node to receive the downlink data.

Optionally, when the access network node does not support multicast, or the access network node refuses to join the multicast group, the access network node adds the downlink receiving address and/or the tunnel identifier to the first multicast session response. The downlink receiving address of the access network node may be the IP address.

In step 602b, when one access and mobility management network element sends the first multicast session request (the message in S601b) to a plurality of access network nodes, the access and mobility management network element may receive the first multicast session response (the message in S602a) from the plurality of access network nodes. In this case, the access and mobility management network element may use the following manners.

Manner 1: After sending the first multicast session request (the message in S601b), the access and mobility management network element immediately sends the first multicast session response (the message in S602b) to the multicast session management network element, and there is no need for the access and mobility management network element to wait for the first multicast session response (the message in S602a) sent by the access network node.

Manner 2: After sending the first multicast session request (the message in S601b), the access and mobility management network element sends one first multicast session response (the message in S602b) to the multicast session management network element after receiving a preset quantity of the first multicast session responses (the messages in S602a). It should be noted that if the access and mobility management network element still receives the first multicast session response (the message in S602a) sent by the access network node after sending the first multicast session response, the access and mobility management network element does not send the first multicast session response (the message in S602b) to the multicast session management network element.

Manner 3: After sending the first multicast session request (the message in S601b), upon receiving one first multicast session response (the message in S602a) each time, the access and mobility management network element sends one first multicast session response (the message in S602b) to the multicast session management network element.

Manner 4: After sending the first multicast session request (the message in S601b), the access and mobility management network element sends one first multicast session response (the message in S602b) to the multicast session management network element after receiving first multicast session responses (the messages in S602a) sent by all access network nodes.

It should be noted that when the access and mobility management network element interacts with the multicast session management network element by using the service-oriented API, that the access and mobility management network element sends the first multicast session response message to the multicast session management network element in step 602b may be replaced with that the multicast session management network element obtains, by invoking the API, a related parameter transferred by the access and mobility management network element, where the related parameter may be the parameter carried in the first multicast session request message. The API may be the API used in S601a. Similarly, the first multicast session response message between the access network node and the access and mobility management network element may also be replaced with the related parameter that is transferred by the access network node and that is obtained by the access and mobility management network element by invoking the API. The related parameter may be the parameter carried in the first multicast session response message.

S603. The multicast session management network element sends the second multicast session request to the user plane function network element.

The second multicast session request carries the user plane forwarding-related information, where the user plane forwarding-related information is used to indicate the user plane forwarding rule of the multicast session.

The user plane forwarding rule of the multicast session may be obtained based on the user plane forwarding-related information of the multicast session, so that the user plane function network element can forward the data of the multicast service to a corresponding terminal based on the user plane forwarding rule. The user plane function network element further forwards the data of the multicast service to the corresponding access network node based on the user plane forwarding rule; and the access network node sends the data of the multicast service to the terminal by using a broadcast transmission manner. For example, the user plane forwarding-related information may include an SDF template, where the SDF template is configured to mark a quintet (the quintet includes a source IP address, a source port, a destination IP address, a destination port and a transport layer protocol) to which a multicast transmission stream is applied. The user plane forwarding-related information may further include QoS information, for example, a session-aggregation maximum bit rate (Session-AMBR), and an allocation and retention priority (ARP).

In an example, the user plane forwarding rule may be generated by the multicast session management network element and is provided to the user plane function network element. The specific process may include: The application server provides a service requirement (for example, service description information of the application server) to a network; then a policy control function (PCF) network element sends a transmission requirement (for example, the QoS information; for another example, multicast service area information) obtained based on the service description information to the multicast session management network element; and when subsequently establishing the multicast transmission stream or modifying the multicast transmission stream, the multicast session management network element sends the user plane forwarding rule to the user plane function network element based on the transmission requirement.

Optionally, when the first multicast session response does not carry the downlink receiving address and/or the tunnel identifier of the access network node, the first multicast session response can implicitly indicate that the access network node joins the multicast group. In this case, the multicast session management network element can determine, based on the first multicast session response, that the access network node joins the multicast group.

Optionally, when the first multicast session response explicitly carries the indication information that used to indicate that the access network node joins the multicast group, the multicast session management network element can determine, based on the first multicast session response, that the access network node joins the multicast group.

Optionally, when the first multicast session response carries the downlink receiving address and/or the tunnel identifier of the access network node, the first multicast session response can implicitly indicate that the access network node does not join the multicast group. In this case, the multicast session management network element can determine, based on the first multicast session response, that the access network node does not join the multicast group.

Optionally, if the first multicast session response carries information about the access network node that joins the multicast group, the second multicast session request can further carry the information about the access network node that joins the multicast group. For example, the second multicast session request carries one list, where the list includes information about a plurality of access network nodes.

Optionally, if the received first multicast session response carries the downlink receiving address and/or the tunnel identifier of the access network node, the second multicast session request further carry the downlink receiving address and/or the tunnel identifier of the access network node.

The second multicast session request may further carry at least one of the source IP address of the multicast service, and the multicast transmission stream identifier.

It should be noted that the user plane function network element can interact with the multicast session management network element by using the service-oriented API, and step 603 may be replaced with that the multicast session management network element transfers the user plane forwarding-related information to the user plane function network element by invoking the API. Further, the multicast session management network element can further transfer other related parameters in the second multicast session request and trigger a related procedure of the user plane.

S604. The user plane function network element receives the second multicast session request, and sets, based on the user plane forwarding-related information, the user plane forwarding rule of the multicast session.

Further, the method further includes: sending the second multicast session response to the multicast session management network element.

In the step, user plane function network element setting the user plane forwarding rule of the multicast session based on the user plane forwarding-related information may include user plane function network element establishing, updating, reconfiguring or installing the user plane forwarding rule of the multicast session based on the user plane forwarding-related information. For example, if the user plane forwarding rule of the multicast session does not exist on the user plane function network element, the user plane function network element may establish or install the user plane forwarding rule of the multicast session based on the received second multicast session request; if the user plane forwarding rule of the multicast session already exists on the user plane function network element, the user plane function network element may update or reconfigure the user plane forwarding rule of the multicast session based on the received second multicast session request.

In an example, the user plane function network element may set the user plane data transmission path of the multicast service based on the user plane forwarding rule, for example, set correspondences between a session identifier and the user plane multicast address of the multicast service and the access network node. If the user plane function network element further receives the downlink receiving address and/or the tunnel identifier of the access network node from the multicast session management network element, the user plane function network element further sets a correspondence between the session identifier of the multicast service and the downlink receiving address and/or the tunnel identifier of the access network node.

In another example, the user plane function network element may map the received data packet to one multicast data stream based on the user plane forwarding rule, and send the data packet by using a QoS forwarding policy of the multicast data stream.

Optionally, the method further includes: allocating, by the user plane function network element, the user plane receiving address, and adding the user plane receiving address to the second multicast session response.

It should be noted that when the user plane function network element interacts with the multicast session management network element by using the service-oriented API, a related message may be replaced with the related parameter obtained by invoking the API. The related parameter may be the parameter carried in the message. Details are not described herein again.

It should be noted that the multicast session management network element may send the second multicast session request to the user plane function network element based on the first multicast session response. In this case, corresponding to different implementations in S602b, S603 and S604 may be performed for a plurality of times. For example, when receiving a plurality of first multicast session responses, the multicast session management network element can be triggered for a plurality of times to send the second multicast session request to the user plane function network element, and second multicast session requests sent for a plurality of times may be the same or may be different.

The multicast session request mentioned in each embodiment of this application may be a multicast session establishment request, a multicast session modification request, or a multicast session establishment/modification request. Correspondingly, the multicast session response may be a multicast session establishment response, a multicast session modification response, or a multicast session establishment/modification response. Details are not described herein again.

It should be noted that a message time sequence in the procedure shown in FIG. 6 is only an example. This application is not limited to the message time sequence shown in FIG. 6. In another example, the multicast session management network element may first send the second multicast session request to the user plane function network element and then send the first multicast session request to the access and mobility management network element (the procedure shown in FIG. 7), and this may alternatively be performed simultaneously.

Figure 7:
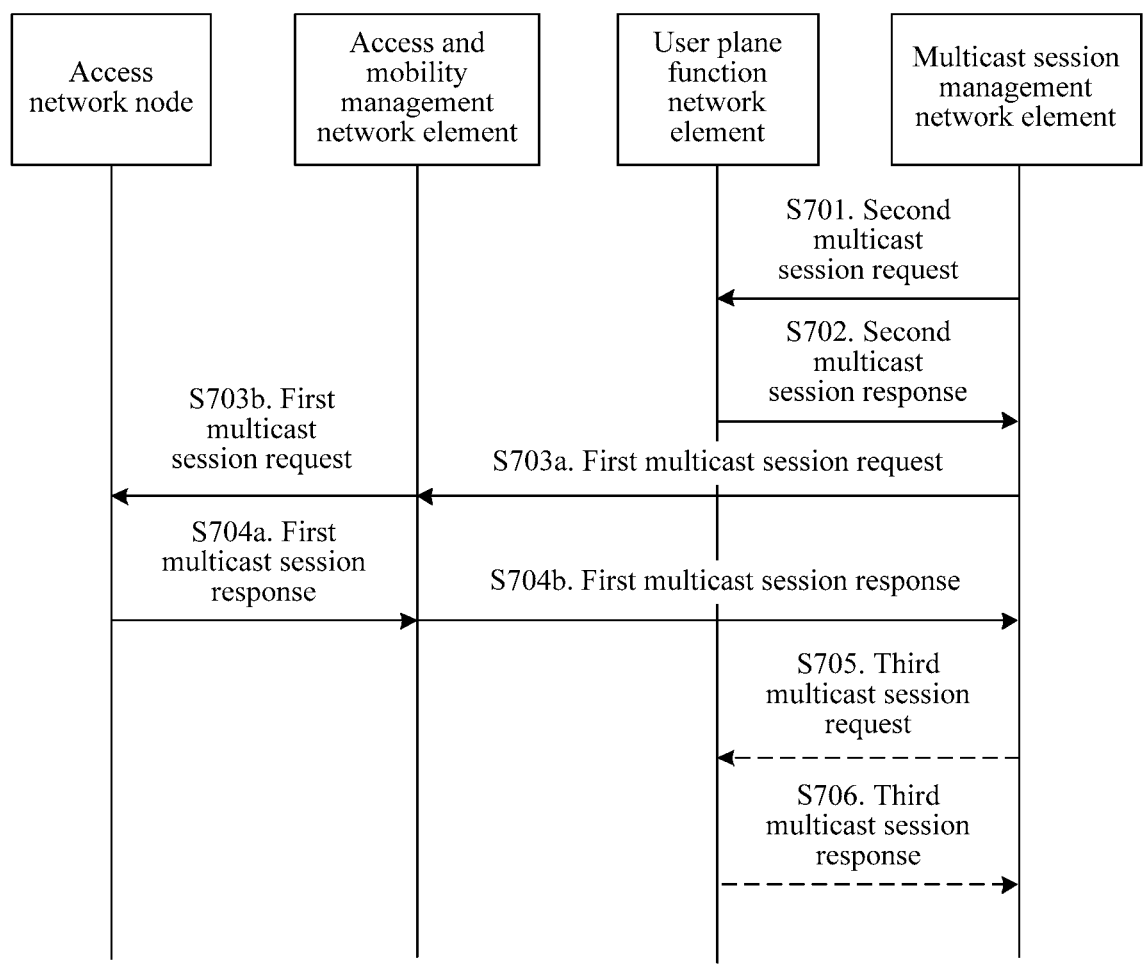

FIG. 7 is a schematic diagram of a communication procedure according to another embodiment of this application. The procedure may be applicable to the communications system shown in FIG. 2, FIG. 3 or FIG. 4. As shown in FIG. 7, the procedure may include:

S701. The multicast session management network element sends the second multicast session request to the user plane function network element.

The second multicast session request carries the user plane forwarding-related information, where the user plane forwarding-related information is used to indicate the user plane forwarding rule of the multicast session. For descriptions of the user plane forwarding-related information and the user plane forwarding rule, refer to the foregoing embodiments. This is not described herein again.

Optionally, the second multicast session request may carry the user plane receiving address of the multicast session. In an implementation, the multicast session management network element may allocate the user plane receiving address to the multicast session, and may add the user plane receiving address to the first multicast session request.

Optionally, the second multicast session request may further carry the downlink receiving address and/or the tunnel identifier of the access network node. In a possible implementation, if the multicast session management network element has obtained the downlink receiving address and/or the tunnel identifier of the access network node, the second multicast session request may further carry the downlink receiving address and/or the tunnel identifier of the access network node.

Optionally, the second multicast session request may further carry the source IP address of the multicast service, and the multicast transmission stream identifier.

In a possible implementation, the user plane function network element may provide a related service for the multicast session management network element by using the service-oriented API interface. The multicast session management network element transfers the related parameter to the user plane function network element by invoking the API interface, and triggers the related procedure of the user plane.

For other implementations of the step, refer to S603 in the procedure shown in FIG. 6. Details are not described herein again.

S702. The user plane function network element receives the second multicast session request, and sets, based on the user plane forwarding-related information, the user plane forwarding rule of the multicast session.

Further, the procedure (method) may further include: sending the second multicast session response to the multicast session management network element.

In the step, for specific implementation of setting the user plane forwarding rule of the multicast session based on the user plane forwarding-related information, refer to the related description of S604 in FIG. 6.

Optionally, the second multicast session response may carry the access network node side user plane multicast receiving address of the multicast session. Optionally, the procedure (method) may further include: allocating, by the user plane function network element, the access network node side user plane multicast receiving address to the multicast session, and adding the access network node side user plane multicast receiving address to the second multicast session response.

Optionally, the procedure (method) may further include: allocating, by the user plane function network element, the user plane receiving address, and adding the user plane receiving address to the second multicast session response.

Optionally, the procedure (method) may further include that the multicast session management network element establishes correspondences between the multicast session identifier and the multicast transmission stream identifier of the multicast service, the user plane receiving address and the access network node side user plane multicast receiving address.

In a possible implementation, the user plane function network element can provide a related service for the multicast session management network element by using the service-oriented API interface. The multicast session management network element obtains, by invoking the API interface, the related parameter transferred by the user plane function network element. The API may be the API used in S701.

For other implementations of the step, refer to S604 in the procedure shown in FIG. 6. Details are not described herein again.

S703a and S703b. The multicast session management network element sends the first multicast session request to the access and mobility management network element, and the access and mobility management network element sends the first multicast session request to the access network node.

The first multicast session request carries the multicast session context. The first multicast session request may be used to request to establish the multicast session based on the multicast session context.

Optionally, the first multicast session request may carry the user plane receiving address of the multicast session.

Optionally, the first multicast session request may carry the access network node side user plane multicast receiving address of the multicast session. In the procedure (method), the access network node side user plane multicast receiving address may be allocated by the user plane function network element and is carried in the second multicast session response or is carried in another signaling for transmission to the multicast session management network element.

In a possible implementation, the access and mobility management network element may provide a related service for the multicast session management network element by using the service-oriented API interface. The multicast session management network element transfers the related parameter to the access and mobility management network element by invoking the API interface, and triggers a corresponding procedure. In another possible implementation, the access network node may provide a related service for the access and mobility management network element by using the service-oriented API interface. The access and mobility management network element transfers the related parameter to the access network node by invoking the API interface, and triggers a corresponding procedure.

For implementation of the step, refer to S601a and S601b in the procedure shown in FIG. 6. Details are not described herein again.

S704a and S704b. The access network node receives the first multicast session request, and sends the first multicast session response to the access and mobility management network element, where the access and mobility management network element sends the first multicast session response to the multicast session management network element.

For implementation of the step, refer to S602a and S602b in the procedure shown in FIG. 6. Details are not described herein again.

S705. The multicast session management network element sends a third multicast session request to the user plane function network element.

Optionally, the third multicast session request carries the downlink receiving address and/or the tunnel identifier of the access network node.

Optionally, the third multicast session request carries information about the access network node that joins the user plane multicast address of the access network node.

Optionally, when the first multicast session response does not carry the downlink receiving address and/or the tunnel identifier of the access network node, the multicast session management network element considers, by default, that the access network node joins the multicast group.

Optionally, when the first multicast session response explicitly carries the indication information that indicates that the access network node joins the multicast group, the multicast session management network element considers that the access network node joins the multicast group.

Optionally, when the first multicast session response carries the downlink receiving address and/or the tunnel identifier of the access network node, the multicast session management network element considers that the access network node does not join the multicast group.

In a possible implementation, the user plane function network element may provide a related service for the multicast session management network element by using the service-oriented API interface. The multicast session management network element transfers the related parameter to the user plane function network element by invoking the API interface, and triggers the related procedure of the user plane. The API may be the API used in S701.

S706. The user plane function network element receives the third multicast session request.

Optionally, the procedure (method) may further include: setting the multicast session (the transmission path) based on the carried downlink receiving address and/or tunnel identifier of the access network node.

Optionally, the procedure (method) may further include: sending a third multicast session response to the multicast session management network element.

Optionally, the procedure (method) may further include: establishing or updating, by the user plane function network element, a correspondence between the address or the tunnel identifier and the multicast session identifier based on the downlink receiving address and/or the tunnel identifier of the access network node that are carried in the third multicast session request.

In a possible implementation, the user plane function network element may provide a related service for the multicast session management network element by using the service-oriented API interface. The multicast session management network element obtains, by invoking the API interface, the related parameter transferred by the user plane function network element. The API may be the API used in S705.

It should be noted that, corresponding to different implementations of S704b, S705 and S706 may be performed for a plurality of times.

It should also be noted that S705 and S706 are optional steps (shown in the dashed line in FIG. 7). For example, if the first multicast session response received by a session management network element does not carry the downlink receiving address and/or the tunnel identifier of the access network node, S705 and S706 may not be performed.

In the procedure shown in FIG. 7, the first multicast session request, the second multicast session request and the third multicast session request may also be referred to as a multicast session establishment request, a multicast session modification request or a multicast session establishment/modification request.

Figure 8:
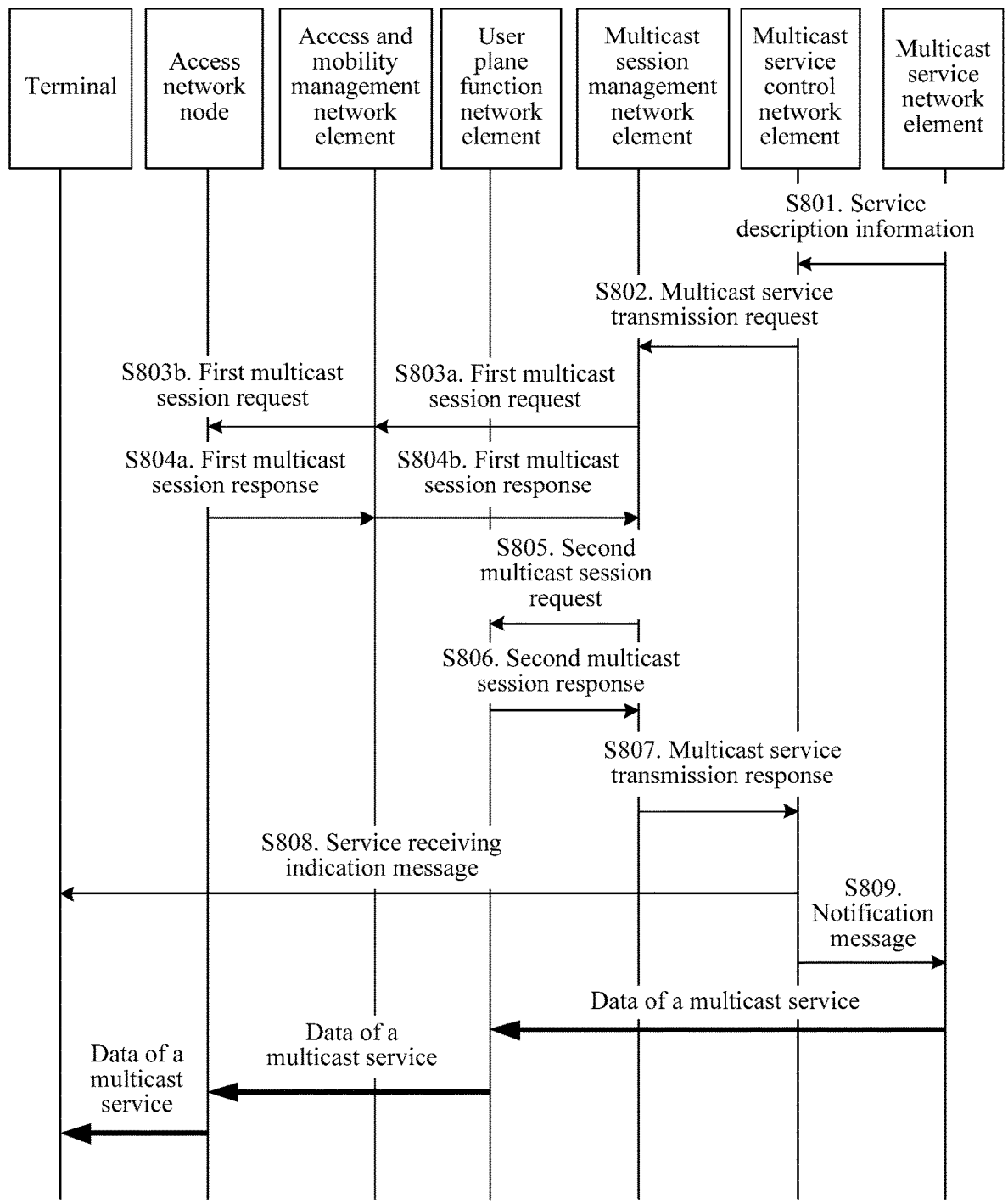

FIG. 8 is a schematic diagram of a communication procedure according to another embodiment of this application. The procedure may be applicable to the communications system shown in FIG. 3 or FIG. 4. As shown in FIG. 8, the procedure may include:

S802. The multicast service control network element sends the multicast service transmission request to the multicast session management network element.

Optionally, the procedure (method) may further include: determining, by the multicast service control network element, based on the service description information, and/or other related information, or by using another manner, whether to use the multicast transmission manner to transmit the multicast service. In S802, if determining to use the multicast transmission manner to transmit the multicast service, the multicast service control network element sends the multicast service transmission request to the multicast session management network element.

The other related information may be a service transmission policy. For example, the multicast transmission manner is always used for a specific service. For another example, in a specific time period (such as 12:00 to 18:00), the multicast transmission manner is used for all services. The multicast service control network element determines whether to use the multicast transmission manner or the unicast transmission manner to transmit the multicast service. In another implementation, the multicast service control network element obtains, by using a manner in which a terminal reports, quantity and location information of the terminal that receives the multicast service, and receiving quality information of a broadcast bearer. For another example, the multicast service control network element can further determine, with reference to other information such as the quantity and location information of the terminal that receives the multicast service, and the quality information of receiving the broadcast bearer, whether to use the multicast transmission manner or the unicast transmission manner to transmit the multicast service. If determining to use the multicast transmission manner to transmit the multicast service, the multicast service control network element sends the multicast service transmission request to the multicast session management network element. The multicast service transmission request may carry the service description information of the multicast service.

Optionally, if the multicast service control network element has obtained the multicast transmission stream identifier from the multicast session management network element, the procedure (method) may further include that the multicast service control network element may add the multicast transmission stream identifier to the multicast service transmission request for transmission to the multicast session management network element.

In another implementation, the multicast session management network element may provide a related service for the multicast service control network element by using the service-oriented API interface. The multicast service control network element transfers description information of the multicast service, and/or the multicast transmission stream identifier to the multicast session management network element by invoking the API interface, and triggers a corresponding procedure.

S803a and S803b. The multicast session management network element sends the first multicast session request to the access and mobility management network element, and the access and mobility management network element sends the first multicast session request to the access network node.

The first multicast session request may carry the multicast session context. The first multicast session request is used to request to establish the multicast session based on the multicast session context. For specific implementation of the step, refer to S601a and S601b in the procedure shown in FIG. 6. Same content is not described herein again.

In the step, the multicast session management network element starts to establish the multicast transmission path, that is, establish the multicast session.

Optionally, the procedure (method) may further include: allocating, by the multicast session management network element, the multicast session identifier to a to-be-established multicast session.

Optionally, the procedure (method) may further include that after receiving the multicast service transmission request, the multicast session management network element allocates the multicast session identifier to the multicast session based on the multicast service transmission request. For example, the multicast session management network element may determine, based on the service description information of the multicast service carried in the multicast service transmission request, whether a multicast session corresponding to the multicast service has been established. If the multicast session corresponding to the multicast service has not been established, the multicast session management network element allocates the multicast session identifier to the multicast service.

Optionally, the multicast session context may include the multicast session identifier, and may further include QoS information of the multicast session.

S804a and S804b. The access network node receives the first multicast session request, and sends the first multicast session response to the access and mobility management network element, where the access and mobility management network element sends the first multicast session response to the multicast session management network element.

For specific implementation of the step, refer to S602a and S602b in the procedure shown in FIG. 6. Same content is not described herein again.

S805. The multicast session management network element sends the second multicast session request to the user plane function network element after receiving the first multicast session response.

The second multicast session request carries the user plane forwarding-related information, where the user plane forwarding-related information is used to indicate the user plane forwarding rule of the multicast session.

For specific implementation of the step, refer to S603 in the procedure shown in FIG. 6. Same content is not described herein again.

S806. The user plane function network element receives the second multicast session request, and sets, based on the user plane forwarding-related information, the user plane forwarding rule of the multicast session.

Optionally, the procedure (method) may further include: sending the second multicast session response to the multicast session management network element.

For specific implementation of the step, refer to S604 in the procedure shown in FIG. 6. Same content is not described herein again.

S807. The multicast session management network element sends the multicast service transmission response to the multicast service control network element.

The multicast service transmission response may carry the multicast transmission information of the multicast service.

In a possible implementation, the multicast session management network element may provide a related service for the multicast service control network element by using the service-oriented API interface. The multicast service control network element obtains, by invoking the API interface, the related parameter transferred by the multicast session management network element. The API may be the API used in S802.

Optionally, the procedure (method) may further include the following step:

S808. The multicast service control network element sends a service receiving indication message to the terminal.

The service receiving indication message is used to instruct the terminal to receive data of the multicast service.

The service receiving indication message carries the multicast transmission stream identifier, and the service receiving indication message may further carry: a data using frequency of the multicast service, and a service area identifier list of the multicast service.

Optionally, in the procedure, the multicast service control network element may send the multicast service transmission request to the multicast session network element based on triggering of the multicast service network element. Specifically, the following step may be included before S802:

S801. The multicast service network element sends the service description information of the multicast service to the multicast service control network element.

Using an example in which the multicast service network element is the application server, in an implementation, the application server adds the description information of the multicast service to control signaling for transmission to the multicast service control network element.

In another implementation, the multicast service control network element may provide a related service for the application server by using the service-oriented API. When having a transmission requirement, the application server triggers a related procedure by invoking the service-oriented API interface service. Specifically, the application server may send the service description information of the multicast service as a parameter of the API to the multicast service control network element by invoking the multicast-service service function API provided by the multicast service control network element.

Optionally, the procedure (method) may further include: determining, by the multicast service control network element, based on the service description information, and/or other related information, or by using another manner, whether to use the multicast transmission manner to transmit the multicast service. If determining to use the multicast transmission manner to transmit the multicast service, the multicast service control network element sends the multicast service transmission request to the multicast session management network element. For the other related information, refer to description in S802.

Optionally, the procedure may further include the following step:

S809. The multicast service control network element sends a notification message to the multicast service network element, where the notification message indicates that the multicast service network element can send data.

Optionally, the notification message further includes a timer, configured to instruct the multicast service network element to start to send the data after time specified by the timer.

Further, the procedure (method) may further include that the multicast service network element sends the downlink data of the multicast service to the multicast service control network element; the multicast service control network element sends the data to the user plane function network element; the user plane function network element forwards, based on the user plane forwarding rule of the multicast session, the data to the access network node by using the multicast session; the access network node broadcasts the data; and a terminal receiving an indication message receives the data.

Further, the procedure (method) may further include that the multicast service network element sends the downlink data of the multicast service to the user plane function network element; the user plane function network element forwards, based on the user plane forwarding rule of the multicast session, the data to the access network node by using the multicast session; the access network node broadcasts the data; and a terminal receiving an indication message receives the data.

For example, the IP address (the source IP address) of the multicast service network element and the user plane receiving address (the destination IP address) may be encapsulated in the data of the multicast service. The user plane function network element can match, based on the user plane forwarding rule of the multicast session, a corresponding multicast session identifier by using the address; query, based on the multicast session identifier, an address of a corresponding access network node (may include the access network node side user plane multicast receiving address and/or the downlink receiving address and/or the tunnel identifier of the access network node); and encapsulate and send the received data by using the queried address of the access network node. When the data is routed to the access network node, the access network node sends the data by using a radio broadcast channel. The terminal listens to the radio broadcast channel, and detects the data.

Figure 9:
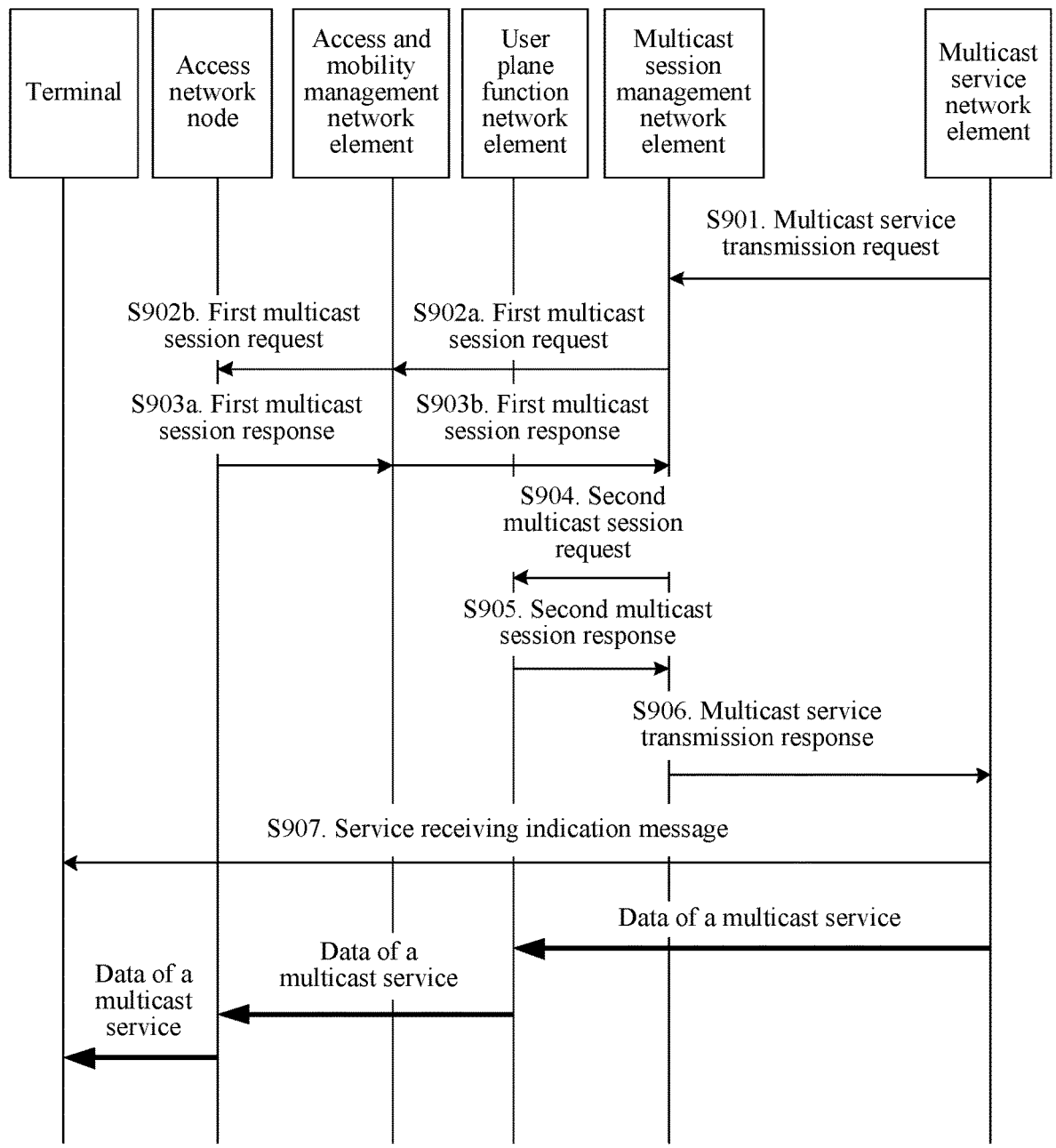

FIG. 9 shows a possible implementation applied to a communications system shown in FIG. 3. As shown in FIG. 9, the procedure may include:

S901. The multicast session management network element receives a multicast service transmission request sent by the multicast service network element.

Optionally, the multicast service transmission request may carry the multicast transmission stream identifier of the multicast service, and may also carry the service description information of the multicast service. For content included in the service description information, refer to the foregoing embodiments. Details are not described herein again.

Optionally, the multicast session management network element can provide a related service for the multicast service network element by using the service-oriented API interface. The multicast service network element transfers the description information of the multicast service, and/or the multicast transmission stream identifier to the multicast session management network element by invoking the API interface, and triggers a corresponding procedure.

S902*a* and S902*b*. The multicast session management network element sends the first multicast session request to the access and mobility management network element, and the access and mobility management network element sends the first multicast session request to the access network node.

The first multicast session request may carry the multicast session context. The first multicast session request is used to request to establish the multicast session based on the multicast session context.

For specific implementation of the step, refer to S601*a* and S601*b* in the procedure shown in FIG. 6. Same content is not described herein again.

In the step, the multicast session management network element starts to establish the multicast transmission path, that is, establish the multicast session.

Optionally, the procedure (method) may further include: allocating, by the multicast session management network element, the multicast session identifier to a to-be-established multicast session.

Optionally, the procedure (method) may further include that after receiving the multicast service transmission request, the multicast session management network element allocates the multicast session identifier to the multicast session based on the multicast service transmission request. For example, the multicast session management network element may determine, based on the service description information of the multicast service carried in the multicast service transmission request, whether a multicast session corresponding to the multicast service has been established. If the multicast session corresponding to the multicast service has not been established, the multicast session management network element allocates the multicast session identifier to the multicast service.

Optionally, the multicast session context may include the multicast session identifier, and may further include QoS information of the multicast session.

S903*a* and S903*b*. The access network node receives the first multicast session request, and sends the first multicast session response to the access and mobility management network element, where the access and mobility management network element sends the first multicast session response to the multicast session management network element.

For specific implementation of the step, refer to S602a and S602b in the procedure shown in FIG. 6. Same content is not described herein again.

S904. The multicast session management network element sends the second multicast session request to the user plane function network element after receiving the first multicast session response.

The second multicast session request may carry the user plane forwarding-related information, where the user plane forwarding-related information is used to indicate the user plane forwarding rule of the multicast session.

For specific implementation of the step, refer to S603 in the procedure shown in FIG. 6. Same content is not described herein again.

S905. The user plane function network element receives the second multicast session request.

Further, the procedure (method) may further include that the user plane function network element sets the user plane forwarding rule of the multicast session based on the user plane forwarding-related information and may further send the second multicast session response to the multicast session management network element.

For specific implementation of the step, refer to S604 in the procedure shown in FIG. 6. Same content is not described herein again.

S906. The multicast session management network element sends the multicast service transmission response to the multicast service network element.

The multicast service transmission response may carry the multicast transmission information of the multicast service. For content included in the multicast transmission information, refer to the foregoing embodiments. Details are not described herein again.

In a possible implementation, the multicast session management network element may provide a related service for the multicast service network element by using the service-oriented API interface. The multicast service network element obtains, by invoking the API interface, the related parameter transferred by the multicast session management network element. The API may be the API used in S901.

Optionally, the procedure may further include the following step:

S907. The multicast service network element sends a service receiving indication message to the terminal.

The service receiving indication message may be used to instruct the terminal to receive data of the multicast service. Optionally, the service receiving indication message carries at least one of the multicast transmission stream identifier and the user plane receiving address. The service receiving indication message may further carry: a data using frequency of the multicast service, and a service area identifier list of the multicast service.

Optionally, the procedure (method) may further include that the multicast service network element sends the downlink data of the multicast service to the user plane function network element; the user plane function network element forwards, based on the user plane forwarding rule of the multicast session, the data to the access network node by using the multicast session; the access network node broadcasts the data; and a terminal receiving an indication message receives the data.

When applied to the communications system shown in FIG. 4, the procedure shown in FIG. 6 may use the procedure shown in FIG. 8 or FIG. 9 based on a service condition.

In this embodiment of this application, based on the procedure shown in FIG. 7, when the procedure shown in FIG. 6 is applied to the communications system shown in FIG. 3, an interaction between the multicast session management network element and the multicast service control network element, and an interaction between the multicast service control network element and the multicast service network element may be added based on the procedure shown in FIG. 7, and an interaction between the multicast service control network element and the terminal may further be added. For the interaction between the multicast session management network element and the multicast service control network element, the interaction between the multicast service control network element and the multicast service network element, and the interaction between the multicast service control network element and the terminal, refer to related steps in the procedure shown in FIG. 8.

In this embodiment of this application, based on the procedure shown in FIG. 7, when the procedure is applied to the communications system shown in FIG. 2, an interaction between the multicast session management network element and the multicast service network element may be added based on the procedure shown in FIG. 7, and an interaction between the multicast service network element and the terminal may further be added. For the interaction between the multicast session management network element and the multicast service network element, and the interaction between the multicast service network element and the terminal, refer to related steps in the procedure shown in FIG. 9.

Figure 10:
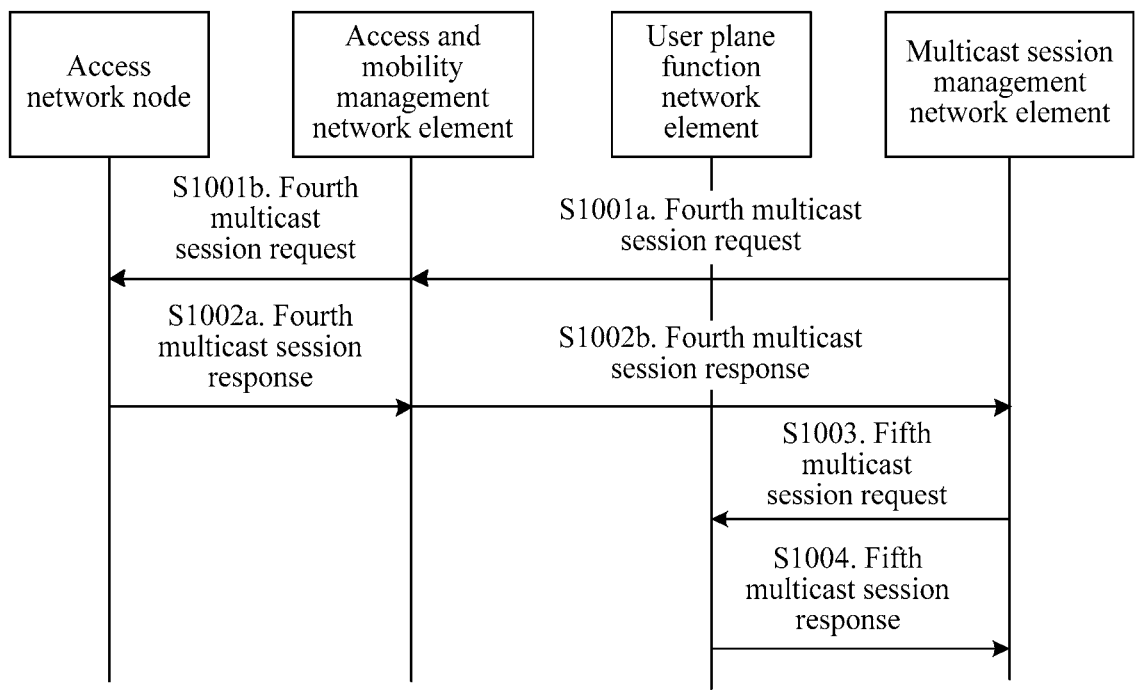

In this embodiment of this application, the multicast session may further be updated after the multicast session is established. FIG. 10 shows a multicast session update procedure according to an embodiment of this application.

The multicast session update procedure shown in FIG. 10 is similar to the multicast session establishment procedure. Same content is not described herein again. As shown in FIG. 10, the procedure may include:

S1001a and S1001b. The multicast session management network element sends a fourth multicast session request to the access and mobility management network element, and the access and mobility management network element sends the fourth multicast session request to the access network node.

The fourth multicast session request can carry the multicast session context. The fourth multicast session request is used to request to update the multicast session (for example, update the multicast session established by using a procedure in FIG. 6 to FIG. 9) based on the multicast session context carried in the fourth multicast session.

Optionally, the fourth multicast session request may carry the access network node side user plane multicast receiving address.

Optionally, the fourth multicast session request may carry the updated QoS information, and may further carry the service area list. The list includes a service area identifier (SAI).

S1002a and S1002b. The access network node receives a fourth multicast session request, and sends a fourth multicast session response to the access and mobility management network element, where the access and mobility management network element sends the fourth multicast session response to the multicast session management network element.

Optionally, the procedure (method) may further include: reconfiguring, by the access network node, based on the QoS information carried in the request, the radio broadcast channel resource.

Optionally, the procedure (method) may further include: reconfiguring, by the access network node, based on service area identifier carried in the request, the radio broadcast channel resource.

S1003. The multicast session management network element sends a fifth multicast session request to the user plane function network element.

The fifth multicast session request may carry the user plane forwarding-related information, where the user plane forwarding-related information is used to indicate the user plane forwarding rule of the multicast session.

Optionally, the fifth multicast session request may carry the updated QoS information.

S1004. The user plane function network element receives the fifth multicast session request.

Optionally, the procedure (method) may further include: setting (for example, updating or reconfiguring) the user plane forwarding rule of the multicast session based on the user plane forwarding-related information carried in the fifth multicast session request.

Optionally, the procedure (method) may further include: sending a fifth multicast session response to the multicast session management network element.

In the procedure shown in FIG. 10, the multicast session request may also be referred to as the multicast session modification request, or the multicast session establishment/modification request.

The multicast session update procedure shown in FIG. 10 may be triggered based on a plurality of reasons. For example, the multicast session update procedure may be triggered based on a transmission policy of the core network. For another example, a provider of the multicast service can trigger the multicast session network element to update the multicast session (for example, the multicast service network element or the multicast service control network element triggers the multicast service session management network element to update the multicast session). For another example, multicast transmission stream status information sent by the terminal to the multicast session management network element may also trigger the multicast session update procedure.

That the multicast service control network element triggers the multicast service session management network element to update the multicast session is used an example. Before S1001a and S1001b, the following steps may be further included.

The multicast service network element sends the service description information of the multicast service to the multicast service control network element. Optionally, the service description information of the multicast service includes the SAI and/or the updated QoS information. After receiving the service description information of the multicast service, the multicast service control network element determines, based on the service description information, to transmit the multicast service by using the multicast manner; and sends the multicast service transmission request to the multicast session management network element, where the multicast service transmission request is used to request to transmit the multicast service. The multicast service transmission request may carry the service description information of the multicast service. After receiving the multicast service transmission request, the multicast session management network element determines, based on the carried service description information, that the service description information of the multicast service has been updated, (for example, the QoS information has changed), and the multicast session management network element determines that the multicast session of the multicast service needs to be updated.

Optionally, after S1004, the following step may further be included: sending, by the multicast session management network element, the multicast service transmission response to the multicast service control network element, where the multicast service transmission response carries the multicast transmission information of the multicast service.

It should be noted that a message time sequence in the procedure shown in FIG. 10 is only an example. This application is not limited to the message time sequence shown in FIG. 10. In another example, the multicast session management network element may first interact with the user plane function network element, and then interact with the access and mobility management network element, and this may alternatively be performed simultaneously.

It should be noted that in an implementation, in the procedure shown in FIG. 10, S1001a and S1002b are optional steps. For example, when the radio broadcast channel resource of the access network node does not need to be updated, S1001a and S1002b may not be performed. In another implementation, S1003 and S1004 in FIG. 10 are optional steps. For example, when the user plane forwarding rule does not need to be updated, S1003 and S1004 may not be performed.

The solutions provided in the embodiments of this application are described above mainly from a perspective of interaction between different network elements. It can be understood that to implement the foregoing functions, each network element includes a corresponding hardware structure and/or software module for performing each function. With reference to the units (elements, and components) and algorithm steps of each example described in the embodiments disclosed in this application, embodiments of this application can be implemented in a form of hardware or hardware and computer software. Whether a function is performed by hardware or computer software driving hardware depends on particular applications and design constraints of the technical solutions. A person skilled in the art may use different methods to implement the described functions for each particular application, but it should not be considered that the implementation falls beyond the scope of the technical solutions in the embodiments of this application.

In the embodiments of this application, functional units (elements, and components) of the multicast session management network element, the multicast service control network element and the user plane function network element may be divided based on the foregoing method examples. For example, each functional unit (element, and component) may be divided for each corresponding function, or two or more functions may be integrated in a processing unit (element, and component). The integrated unit (element, and component) may be implemented in a form of hardware, or may be implemented in a form of a software functional unit (element, and component). It should be noted that in the embodiments of this application, the unit (element, and component) division is an example, and is merely logical function division, and there may be other division in actual applications.

When an integrated unit (element, and component) is used, FIG. 11 is a schematic structural diagram of a multicast session management network element according to an embodiment of this application. As shown in FIG. 11, a multicast session management network element 1100 includes: a multicast service transmission request module 1101, a first multicast session request module 1102, and a second multicast session request module 1103, where the multicast service transmission request module 1101 is an optional module.

The first multicast session request module 1102 is configured to send the first multicast session request to the access and mobility management network element, where the first multicast session request carries the multicast session context, and the first multicast session request is used to request to establish the multicast session based on the multicast session context. The second multicast session request module 1103 is configured to send the second multicast session request to the user plane function network element, where the second multicast session request carries the user plane forwarding-related information, and the user plane forwarding-related information is used to indicate the user plane forwarding rule of the multicast session.

Optionally, the multicast service transmission request module 1101 is configured to: receive the multicast service transmission request from the multicast service network element, and send a multicast service transmission response to the multicast service network element, where the multicast service transmission response carries the multicast transmission information of the multicast service. The first multicast session request module 1102 is specifically configured to send the first multicast session request based on the multicast service transmission request, and the second multicast session request module is specifically configured to send the second multicast session request based on the multicast service transmission request.

Optionally, the multicast service network element is an application server, a service capability exposure network element or a multicast service control network element.

In a possible design, multicast transmission information of the multicast service includes a user plane receiving address of the multicast session.

Optionally, the second multicast session request module 1103 is further configured to allocate the user plane receiving address to the multicast session, and the second multicast session request further carries the user plane receiving address. Alternatively, the second multicast session request module 1103 is further configured to receive the second multicast session response from the user plane function network element, where the second multicast session response carries the user plane receiving address, and the user plane receiving address is allocated by the user plane function network element to the multicast session.

Optionally, the first multicast session request module 1102 is further configured to allocate the access network node side user plane multicast receiving address to the multicast session; and the first multicast session request carries the access network node side user plane multicast receiving address, and the second multicast session request carries the access network node side user plane multicast receiving address.

Optionally, the first multicast session request module 1102 is further configured to: receive the access network node side user plane multicast receiving address sent by the user plane function network element, and add the access network node side user plane multicast receiving address to the first multicast session request.

In a possible design, the first multicast session request module 1102 is further configured to receive the first multicast session response sent by the access and mobility management network element, where the first multicast session response carries the downlink receiving address and/or the tunnel identifier of the access network node. The second multicast session request module 1103 is further configured to add the downlink receiving address and/or the tunnel identifier of the access network node to the second multicast session request.

FIG. 12 is a schematic structural diagram of a multicast session management network element 1200 according to an embodiment of this application, namely, is another schematic structural diagram of the multicast session management network element 1100. As shown in FIG. 12, the multicast session management network element 1200 includes a processor 1201, and a network interface 1202. The processor 1201 may also be a controller. The processor 1201 is configured to support the multicast session management network element in executing functions in FIG. 6 to FIG. 10. The network interface 1202 is configured to support the function of receiving and sending, by the multicast session management network element, messages. The multicast session management network element 1200 may further include a memory 1203, where the memory 1203 is configured to be coupled to the processor 1201, and stores a program instruction and data that are necessary to the multicast session management network element. The processor 1201, the network interface 1202, and the memory 1203 are connected to each other. The memory 1203 is configured to store an instruction. The processor 1201 is configured to execute the instruction stored in the memory 1203 to control the network interface 1202 to receive and send a message and complete the step of executing a corresponding function by the multicast session management network element in the method described above.

In the embodiments of this application, for concepts, explanations, detailed descriptions and other steps that are related to the technical solutions provided in the embodiments of this application and that are related to the multicast session management network element 1100 and the multicast session management network element 1200, refer to descriptions about the content in the foregoing method or other embodiments. Details are not described herein again.

When an integrated unit (element, and component) is used, FIG. 13 is a schematic structural diagram of a multicast service control network element according to an embodiment of this application. As shown in FIG. 13, a multicast service control network element 1300 includes a service transmission manner determining module 1301, a multicast service transmission request sending module 1302, a multicast service transmission response receiving module 1303, and a multicast service receiving indication module 1304. The service transmission manner determining module 1301 and the multicast service receiving indication module 1304 are optional modules.

The multicast service transmission request sending module 1302 is configured to send the multicast service transmission request to the multicast session management network element. The multicast service transmission request carries the service description information of the multicast service. The multicast service transmission response receiving module 1303 is configured to receive the multicast service transmission response from the multicast session management network element, where the multicast service transmission response carries the multicast transmission information of the multicast service.

Optionally, the service transmission manner determining module 1301 is configured to determine to transmit the multicast service by using a multicast transmission manner; and the multicast service transmission request sending module is specifically configured to send the multicast service transmission request to the multicast session management network element after the determining to transmit the multicast service by using the multicast transmission manner.

Optionally, the multicast transmission information of the multicast service includes the user plane receiving address of the multicast session.

Optionally, the multicast service receiving indication module 1304 may be configured to send the service receiving indication message to a terminal, where the service receiving indication message is used to instruct the terminal to receive the data of the multicast service. Optionally, the service receiving indication message includes at least one of the multicast transmission stream identifier and the user plane receiving address.

FIG. 14 is a schematic structural diagram of a multicast service control network element 1400 according to an embodiment of this application, namely, is another schematic structural diagram of the multicast service control network element 1300. As shown in FIG. 14, the multicast service control network element 1400 includes a processor 1401, and a network interface 1402. The processor 1401 may also be a controller. The processor 1401 is configured to support the multicast service control network element in executing functions in FIG. 8. The network interface 1402 is configured to support the function of receiving and sending, by the multicast service control network element, messages. The multicast service control network element 1400 may further include a memory 1403, where the memory 1403 is configured to be coupled to the processor 1401, and stores a program instruction and data that are necessary to the multicast service control network element. The processor 1401, the network interface 1402, and the memory 1403 are connected to each other. The memory 1403 is configured to store an instruction. The processor 1401 is configured to execute the instruction stored in the memory 1403 to control the network interface 1402 to receive and send a message and complete the step of executing a corresponding function by the multicast service control network element in the method described above.

In the embodiments of this application, for concepts, explanations, detailed descriptions and other steps that are related to the technical solutions provided in the embodiments of this application and that are related to the multicast service control network element 1300 and the multicast service control network element 1400, refer to descriptions about the content in the foregoing method or other embodiments. Details are not described herein again.

When an integrated unit (element, and component) is used, FIG. 15 is a schematic structural diagram of a user plane function network element according to an embodiment of this application. As shown in FIG. 15, a user plane function network element 1500 includes: a multicast session request receiving module 1501, a multicast session request processing module 1502, a data forwarding module 1503.

The multicast session request receiving module 1501 is configured to receive the multicast session request sent by the multicast session management network element, where the multicast session request carries the user plane forwarding-related information. The multicast session request processing module 1502 is configured to set the user plane forwarding rule of the multicast session based on the user plane forwarding-related information.

Optionally, the multicast session request processing module 1502 is further configured to: allocate the user plane receiving address to the multicast session, and send the multicast session response to the multicast session management network element, where the multicast session response carries the user plane receiving address.

Optionally, the multicast session request processing module 1502 is further configured to: allocate the access network node side user plane multicast receiving address to the multicast session, and send the access network node side user plane multicast receiving address to the multicast session management network element. The multicast session request may carry the downlink receiving address and/or the tunnel identifier of the access network node.

Optionally, the multicast session request carries the access network node side user plane multicast receiving address, and/or the downlink receiving address and/or the tunnel identifier of the access network node.

Optionally, the data forwarding module 1503 is configured to forward, based on the user plane forwarding rule of the multicast session, the data to the access network node by using the multicast session.

FIG. 16 is a schematic structural diagram of a user plane function network element 1600 according to an embodiment of this application, namely, is another schematic structural diagram of the user plane function network element 1500. As shown in FIG. 16, the user plane function network element 1600 includes a processor 1601, and a network interface 1602. The processor 1601 may also be a controller. The processor 1601 is configured to support the user plane function network element in executing functions in FIG. 6 to FIG. 10. The network interface 1602 is configured to support the function of receiving and sending, by the user plane function network element, messages. The user plane function network element 1600 may further include a memory 1603. The memory 1603 is configured to be coupled to the processor 1601 and stores a program instruction and data that are necessary to the user plane function network element. The processor 1601, the network interface 1602, and the memory 1603 are connected to each other. The memory 1603 is configured to store an instruction. The processor 1601 is configured to execute the instruction stored in the memory 1603 to control the network interface 1602 to receive and send a message and complete the step of executing a corresponding function by the user plane function network element in the method described above.

In the embodiments of this application, for concepts, explanations, detailed descriptions and other steps that are related to the technical solutions provided in the embodiments of this application and that are related to the user plane function network element 1500 and the user plane function network element 1600, refer to descriptions about the content in the foregoing method or other embodiments. Details are not described herein again.

It should be noted that the processor in the embodiments of this application may be a central processing unit CPU), a general-purpose processor, a digital signal processor (DSP), an application-specific integrated circuit (ASIC), a field programmable gate array (FPGA), or another programmable logical device, a transistor logical device, a hardware component, or a combination thereof. The processor can implement or perform various examples of logic blocks, modules, and circuits described with reference to content disclosed in this application. The processor may also be a combination that implements a computing function, for example, a combination of one or more microprocessors or a combination of a DSP and a microprocessor. The memory may be integrated in the processor, or may be separately disposed with the processor.

An embodiment of this application further provides a computer-readable storage medium, configured to store some instructions. When these instructions are executed, any one of methods related to the multicast session management network element, the multicast service control network element or the user plane function network element may be completed.

An embodiment of this application further provides a computer program product, configured to store a computer program, where the computer program is configured to perform the communication method in the method embodiments described above.

An embodiment of this application provides a chip, where the chip includes a processor, configured to support a network element (a network device) in implementing the function related to the multicast session management network element, the multicast service control network element or the user plane function network element. In a possible design, the chip further includes a memory. The memory is configured to store a program instruction and data that are necessary to the network element.

A person skilled in the art should understand that the embodiments of this application may be provided as a method, a system, or a computer program product. Therefore, the embodiments of this application may use a form of hardware only embodiments, software only embodiments, or embodiments with a combination of software and hardware. Moreover, the embodiments of this application may use a form of a computer program product that is implemented on one or more computer-usable storage media (including but not limited to a disk memory, a CD-ROM, an optical memory, and the like) that include computer-usable program code.

The embodiments of this application is described with reference to the flowcharts and/or block diagrams of the method, the device (system), and the computer program product according to the embodiments of this application. It should be understood that computer program instructions may be used to implement each process and/or each block in the flowcharts and/or the block diagrams and a combination of a process and/or a block in the flowcharts and/or the block diagrams. These computer program instructions may be provided for a general-purpose computer, a dedicated computer, an embedded processor, or a processor of any other programmable data processing device to generate a machine, so that the instructions executed by a computer or a processor of any other programmable data processing device generate an apparatus for implementing a specified function in one or more processes in the flowcharts and/or in one or more blocks in the block diagrams.

These computer program instructions may be stored in a computer-readable memory that can instruct the computer or any other programmable data processing device to work in a specific manner, so that the instructions stored in the computer-readable memory generate an artifact that includes an instruction apparatus. The instruction apparatus implements a specified function in one or more processes in the flowcharts and/or in one or more blocks in the block diagrams.

These computer program instructions may also be loaded onto a computer or any other programmable data processing device, so that a series of operations and steps are performed on the computer or the another programmable device, thereby generating computer-implemented processing. Therefore, the instructions executed on the computer or any other programmable device provide steps for implementing a specific function in one or more processes in the flowcharts and/or in one or more blocks in the block diagrams.

What is claimed is:

1. A communications system, comprising: a multicast session management network element, an access and mobility management network element and a user plane function network element, wherein the multicast session management network element is configured to: send a first multicast session request to the access and mobility management network element, wherein the first multicast session request carries a multicast session context, and the first multicast session request is used to request to establish a multicast session based on the multicast session context; and send a second multicast session request to the user plane function network element, wherein the second multicast session request carries user plane forwarding-related information, and the user plane forwarding-related information is used to indicate a user plane forwarding rule of the multicast session;

the access and mobility management network element is configured to: receive the first multicast session request, and send the first multicast session request to an access network node; and the user plane function network element is configured to: receive the second multicast session request, and set, based on the user plane forwarding-related information, the user plane forwarding rule of the multicast session.

2. The communications system according to claim 1, further comprising a multicast service control network element, wherein the multicast service control network element is configured to send a multicast service transmission request to the multicast session management network element, wherein the multicast service transmission request carries service description information of a multicast service;

the multicast session management network element is further configured to: receive the multicast service transmission request, and send the first multicast session request and the second multicast session request based on the multicast service transmission request; and the multicast session management network element is further configured to send a multicast service transmission response to the multicast service control network element, wherein the multicast service transmission response carries multicast transmission information of the multicast service.

3. The communications system according to claim 2, wherein the multicast service control network element is further configured to: determine to transmit the multicast service by using a multicast transmission manner, and send the multicast service transmission request to the multicast session management network element after the determining to transmit the multicast service by using a multicast transmission manner.

4. The communications system according to claim 2, wherein the multicast transmission information of the multicast service comprises at least one of a multicast transmission stream identifier and a user plane receiving address that are of the multicast service; and the multicast service control network element is further configured to send a service receiving indication message to a terminal, wherein the service receiving indication message carries at least one of the multicast transmission stream identifier and the user plane receiving address, and the service receiving indication message is used to instruct the terminal to receive data of the multicast service.

5. The communications system according to claim 1, wherein the first multicast session request carries an access network node side user plane multicast receiving address, and the second multicast session request carries the access network node side user plane multicast receiving address of the access network node; and
  the multicast session management network element is further configured to allocate the access network node side user plane multicast receiving address to the multicast session.

6. The communications system according to claim 1, wherein
  the user plane function network element is further configured to: allocate an access network node side user plane multicast receiving address to the multicast session, and send the access network node side user plane multicast receiving address to the multicast session management network element; and
  the multicast session management network element is further configured to: receive the access network node side user plane multicast receiving address, and add the access network node side user plane multicast receiving address to the first multicast session request.

7. The communications system according to claim 1, further comprising the access network node, wherein
  the access network node is configured to: receive the first multicast session request from the access and mobility management network element, and send a first multicast session response to the access and mobility management network element, wherein the first multicast session response carries path information of the access network node, and the path information comprises at least one of a downlink receiving address and a tunnel identifier;
  the access and mobility management network element is further configured to: receive the first multicast session response, and send the first multicast session response to the multicast session management network element; and
  the multicast session management network element is further configured to: receive the first multicast session response, and add the path information of the access network node to the second multicast session request.

8. The communications system according to claim 1, further comprising the access network node, wherein
  the user plane function network element is further configured to forward, based on the user plane forwarding rule of the multicast session, data to the access network node by using the multicast session; and
  the access network node is further configured to: receive the data forwarded by the user plane function network element, and broadcast the data.

9. A multicast session management network element, comprising: a processor and a memory, wherein
  the memory is configured to store an instruction;
  the processor is configured to read the instruction stored in the memory, to perform the following operations:
  sending a first multicast session request to an access and mobility management network element, wherein the first multicast session request carries a multicast session context, and the first multicast session request is used to request to establish a multicast session based on the multicast session context; and
  sending a second multicast session request to a user plane function network element, wherein the second multicast session request carries user plane forwarding-related information, and the user plane forwarding-related information is used to indicate a user plane forwarding rule of the multicast session.

10. The multicast session management network element according to claim 9, wherein the processor is further configured to:
  receive a multicast service transmission request from a multicast service network element;
  send a multicast service transmission response to the multicast service network element, wherein the multicast service transmission response carries multicast transmission information of the multicast service;
  the sending a first multicast session request to an access and mobility management network element comprises:
  sending, based on the multicast service transmission request, the first multicast session request to the access and mobility management network element; and
  the sending a second multicast session request to a user plane function network element comprises:
  sending, based on the multicast service transmission request, the second multicast session request to the user plane function network element.

11. The multicast session management network element according to claim 9, wherein the processor is further configured to:
  allocate an access network node side user plane multicast receiving address to the multicast session, wherein the first multicast session request and the second multicast session request carry the access network node side user plane multicast receiving address.

12. The multicast session management network element according to claim 9, wherein the processor is further configured to:
  receive an access network node side user plane multicast receiving address from the user plane function network element, and add the access network node side user plane multicast receiving address to the first multicast session request.

13. The multicast session management network element according to claim 9, wherein the processor is further configured to:
  receive a first multicast session response from the access and mobility management network element, wherein the first multicast session response carries path information of the access network node; and add the path information of the access network node to the second multicast session request, wherein the path information comprises at least one of a downlink receiving address and a tunnel identifier.

14. A user plane function network element, comprising a processor and a memory, wherein
  the memory is configured to store an instruction;
  the processor is configured to read the instruction stored in the memory, to perform the following operations:
  receiving a multicast session request from a multicast session management network element, wherein the multicast session request carries user plane forwarding-related information and carries path information of the access network node, and the path information comprises at least one of a downlink receiving address and a tunnel identifier; and
  setting a user plane forwarding rule of a multicast session based on the user plane forwarding-related information.

15. The user plane function network element according to claim 14, wherein the processor is further configured to:
  allocate a user plane receiving address to the multicast session; and send a multicast session response to the multicast session management network element, wherein the multicast session response carries the user plane receiving address.

16. The user plane function network element according to claim 14, wherein the processor is further configured to:
allocate an access network node side user plane multicast receiving address to the multicast session; and
send the access network node side user plane multicast receiving address to the multicast session management network element.

17. The user plane function network element according to claim 16, wherein the multicast session request carries path information of the access network node, and the path information comprises at least one of a downlink receiving address and a tunnel identifier.

* * * * *

UNITED STATES PATENT AND TRADEMARK OFFICE
CERTIFICATE OF CORRECTION

PATENT NO. : 11,425,537 B2  
APPLICATION NO. : 16/858544  
DATED : August 23, 2022  
INVENTOR(S) : Yanmei Yang et al.

It is certified that error appears in the above-identified patent and that said Letters Patent is hereby corrected as shown below:

In the Specification

In Column 1, Line 11, delete "2017," and insert -- 2017. --.

In Column 1, Line 31, delete "(ILTE)" and insert -- (LTE) --.

In Column 20, Line 64, delete "signalcell" and insert -- single cell --.

Signed and Sealed this
Eighteenth Day of October, 2022

Katherine Kelly Vidal
*Director of the United States Patent and Trademark Office*